(12) United States Patent
Courtemanche et al.

(10) Patent No.: US 11,272,684 B2
(45) Date of Patent: Mar. 15, 2022

(54) CABLE DRIVE UNIT

(71) Applicant: GEA Farm Technologies Canada Inc., Drummondville (CA)

(72) Inventors: Alain Courtemanche, Lefebvre (CA); Yann Desrochers, Drummondville (CA); Denis Courtemanche, Saint-Theodore-d'Acton (CA); Normand Demanche, Drummondville (CA)

(73) Assignee: GEA FARM TECHNOLOGIES CANADA, INC., Drummondville (CA)

( * ) Notice: Subject to any disclaimer, the term of this patent is extended or adjusted under 35 U.S.C. 154(b) by 479 days.

(21) Appl. No.: 15/112,359

(22) PCT Filed: Jan. 21, 2015

(86) PCT No.: PCT/CA2015/050039
§ 371 (c)(1),
(2) Date: Jul. 18, 2016

(87) PCT Pub. No.: WO2015/109403
PCT Pub. Date: Jul. 30, 2015

(65) Prior Publication Data
US 2016/0338310 A1    Nov. 24, 2016

Related U.S. Application Data

(60) Provisional application No. 61/929,748, filed on Jan. 21, 2014.

(51) Int. Cl.
*A01K 1/01*    (2006.01)
*B66D 1/60*    (2006.01)
(Continued)

(52) U.S. Cl.
CPC .............. *A01K 1/0128* (2013.01); *B66D 1/38* (2013.01); *B66D 1/39* (2013.01); *B66D 1/60* (2013.01)

(58) Field of Classification Search
CPC ... B66D 1/20; B66D 1/36; B66D 1/38; B66D 1/39; B66D 1/365; B66D 1/40;
(Continued)

(56) References Cited

U.S. PATENT DOCUMENTS 1,866,911 A * 7/1932 Schroeder ................ B66D 1/36
  187/254
2,028,532 A   1/1936 Treloggen
(Continued)

FOREIGN PATENT DOCUMENTS

GB           2183212 A      6/1987

*Primary Examiner* — Michael R Mansen
*Assistant Examiner* — Raveen J Dias
(74) *Attorney, Agent, or Firm* — GableGotwals

(57) ABSTRACT

This invention relates to a cable drive unit (1) for use with a free stall cleaning system (101). The cable drive unit (1) includes a base frame (3), a support frame (5) being displaceable with respect to the base frame (3) via a corresponding displacement assembly (7), and a drum (9) pivotably mountable about the support frame (5) and displaceable therewith for receiving a cable (11) to be wound about said drum (9). Also described is a kit for assembling a cable drive unit (1) and a free stall cleaning system (101). The invention further includes a method of winding a cable (11) of a free stall cleaning system (101) about a drum (9) via the present cable drive unit (1).

32 Claims, 24 Drawing Sheets

(51) Int. Cl.
*B66D 1/39* (2006.01)
*B66D 1/38* (2006.01)

(58) Field of Classification Search
CPC .... B66D 2700/0191; B66D 1/60; B66D 1/70; B66D 1/66; B66D 1/22; B66D 1/225; B66D 1/24; B66D 1/56; B66D 1/14; A01K 1/0128; B65H 75/00; B65H 75/265
USPC .......................... 242/390, 331, 329, 268, 296
See application file for complete search history.

(56) References Cited

U.S. PATENT DOCUMENTS

| | | | | |
|---|---|---|---|---|
| 2,720,951 A * | 10/1955 | Olson | | B66D 1/20 235/145 R |
| 3,150,844 A * | 9/1964 | Bus, Sr. | | B65H 75/265 242/118.4 |
| 3,456,899 A * | 7/1969 | Burch | | B66D 1/39 242/484 |
| 3,740,021 A * | 6/1973 | Sommer | | B66D 1/39 104/165 |
| 3,836,121 A * | 9/1974 | Jones | | B66D 5/00 254/340 |
| 3,836,122 A * | 9/1974 | Pierce, Jr. | | B66D 1/14 254/273 |
| 4,243,137 A | 1/1981 | Laurenz | | |
| 4,324,386 A * | 4/1982 | Gagnon | | B66D 1/39 254/288 |
| 5,921,529 A * | 7/1999 | Wilson, Sr. | | B66D 1/08 242/396.9 |
| 7,753,344 B1 * | 7/2010 | Moretz | | B66D 1/39 254/331 |
| 2004/0099853 A1 * | 5/2004 | Verakis | | B60P 3/34 254/343 |
| 2004/0261205 A1 | 12/2004 | Berg | | |
| 2009/0207250 A1 * | 8/2009 | Bennett | | F16M 11/105 348/144 |
| 2012/0048152 A1 * | 3/2012 | Kim | | B66D 1/39 108/20 |
| 2012/0193315 A1 * | 8/2012 | Noll | | B66C 19/00 212/312 |
| 2013/0161441 A1 * | 6/2013 | Bjornenak | | B65H 75/4405 242/484.2 |
| 2013/0193391 A1 * | 8/2013 | Fok | | B66D 1/38 254/266 |
| 2013/0240809 A1 * | 9/2013 | Krappinger | | B66D 1/39 254/331 |
| 2014/0014317 A1 * | 1/2014 | Aarsland | | E21B 19/22 166/77.2 |
| 2014/0061558 A1 * | 3/2014 | Einhorn | | B66D 1/39 254/331 |
| 2015/0008381 A1 * | 1/2015 | Hausladen | | B66D 1/30 254/288 |

* cited by examiner

CABLE DRIVE UNIT

CROSS-REFERENCE TO RELATED APPLICATIONS

This United States application is the National Phase of PCT Application No. PCT/CA2015/050039 filed 21 Jan. 2015, which claims priority to U.S. Provisional Application No. 61/929,748 filed 21 Jan. 2014, each of which is incorporated herein by reference.

FIELD OF THE INVENTION

The present invention relates to a cable drive unit, hereinafter referred to also simply as a "drive unit". More particularly, the present invention relates to a cable drive unit, to a kit for assembling the same, to a plant (ex. a farm, a barn, etc.) provided with such a cable drive unit and/or resulting assembly, and to corresponding methods of assembling and operating associated thereto.

BACKGROUND OF THE INVENTION

Free stall cleaner systems and corresponding cable drive units used therewith are well known in the art.

For example, free stall cleaners are typically used to clean the alleys of a free stall barn.

Indeed, taking cows as way of one possible example, as shown in FIG. 1, they are typically free to walk in the barn and manure originating from the cows settles in the alleys.

The main components of a conventional free stall cleaner are typically as follows:

a) scraper(s) (exemplified in FIG. 1);
b) at least one cable drive unit (exemplified in FIG. 2);
c) wheel(s) and/or pulley(s) (exemplified in FIG. 3); and
d) nylon rope(s) or steel cable(s) (exemplified in FIG. 4).

As can be understood from FIGS. 1-8, and FIG. 5 in particular, typically, the cable drive unit wraps a cable around the drum on one side and pulls one of the scrapers. At the same time, the cable on the other side of the drum unrolls. Thus, a scraper is typically going to the gutter to discharge manure while the other scraper returns to the drive unit to get back into position.

It is also known that cable alignment during operation of a drive unit is very important during winding of the cable about the drum. One does not want the cable wrapping over itself (i.e. one row or segment cable wrapping over another such row or segment) because the friction between cable segments causes wear prematurely to the cable.

A conventional system known in the art and intended to ensure proper alignment is a "cable guide", as exemplified in FIG. 6. Typically, the cable passes between two guides which are mounted on a worm shaft driven by a chain and sprockets. The pitch or feed rate is calculated carefully to ensure a good winding in order to avoid each cable wrap rubbing against each other.

Also known in the art are some of the disadvantages associated with such conventional cable drive units and/or chain guides. Namely, and unfortunately, the cable wears down when the cable guide applies pressure for alignment (that is, there is a considerable amount of rubbing between the chain guide and the cable when the chain guide is pushing against the cable to ensure that it is being wound about the drum at a desired location/row for each rotation of the drum, which could be several rotations in a given day, given that most cable drive units are operated 24/7, practically during the entire year, etc.).

In particular, the pressure between chain guide and cable is considerably increased when the scraper is at the end of its stroke (i.e. when there is a lot of tension in the cable, about 2500-3000 lbs, and when the cable is at a considerable "angle" with respect to the drum), as exemplified in FIG. 8. This friction between chain guide and cable results in the premature wear of the cable, along with corresponding drawbacks (considerable time and costs associated with inspection and/or replacement, loss of production due to the downtime of the barn when replacement is required, etc.). In some cases/barns, the cable needs to be replaced every four months, which is very undesirable, for the obvious reasons briefly discussed hereinabove.

As can be easily understood from FIG. 5, another substantial drawback associated with conventional cable drive units is that, when there is a long alley to be cleaned, a longer cable is required to be wound about the drum, which results in significant (i.e. large, wide, etc.) angles occurring at the end of the stroke due to the fact the presence of the corner wheel and the fact that a conventional cable drive unit has a fixed support frame and the cable must move forcefully with a cable guide along the entire and very long traversal span of the drum for winding thereabout. These significant angles that are required for ensuring normal operation of the cable drive unit, thus in turn require having to respect a certain minimal clearance (ex. 6 feet) in front of each side of the cable drive unit (i.e. between cable drive unit and corner wheel, as shown in FIG. 5), to prevent an overly exaggerated or harsh angle of the cable, which in turn prevents farmers for using conventional cable drive units in other various different free-stall-cleaning layouts, especially in areas with restricted space, etc.

Another substantial drawback associated with conventional cable drive units is that the chain guide is meant to be very close to the ground, as shown in FIG. 6, make it prone for accumulating unwanted debris and substances, such as manure from the barn for example, which is also undesirable for obvious reasons.

Hence, in light of the aforementioned, there is a need for an improved cable drive unit which would be able to overcome and/or remedy some of the aforementioned prior art problems. More particularly, it would be particularly useful to provide a cable drive unit that enables to eliminate friction with the cable while making sure to keep proper alignment of the cable during operation (ex. winding, pulling, etc.).

SUMMARY OF THE INVENTION

An object of the present invention is to provide a cable drive unit which, by virtue of its design and components, satisfies some of the above-mentioned needs and which is thus an improvement over other related cable drive units and/or cable drive methods known in the prior art.

In accordance with the present invention, the above object is achieved, as will be easily understood from the present description, with a cable drive unit such as the one briefly described herein and such as the one exemplified in the accompanying drawings.

More particularly, according to one aspect of the present invention, there is provided a cable drive unit comprising:
a base frame;
a support frame being displaceable with respect to the base frame via a corresponding displacement assembly; and
a drum pivotably mountable about the support frame and displaceable therewith for receiving a cable to be wound about said drum.

According to another aspect of the present invention, there is also provided a cable drive unit comprising:
a base frame;
a support frame operatively mountable onto the base frame, and being laterally displaceable with respect to said base via a corresponding displacement assembly; and
a drum pivotably mountable about the support frame for receiving a cable to be wound about said drum.

According to another aspect of the invention, there is also provided an assembly (ex. free stall cleaner, etc.) and/or a plant (ex. farm, barn, etc.) provided with the above-mentioned cable drive unit.

According to yet another aspect of the invention, there is also provided a method of assembling the above-mentioned cable drive unit, assembly and/or plant.

According to yet another aspect of the invention, there is also provided a method of operating the above-mentioned cable drive unit, assembly and/or plant.

More particularly, according to a given aspect of the present invention, there is also provided a method of winding a cable about a drum of a cable drive unit, wherein the method comprises the step of displacing the drum with respect to a base frame while the cable is being wound about the drum. The method may further comprise the step of oppositely displacing the drum with respect to the base frame while the cable is being unwound from the drum. The method may comprise various other additional and/or sub-steps, as explained in greater detail hereinbelow when referring to the operation of the different components and features of the present cable drive unit.

According to another aspect of the invention, there is also provided a kit with corresponding components for assembling the above-mentioned cable drive unit, assembly and/or plant.

According to yet another aspect of the present invention, there is also provided a set of components for interchanging with components of the above-mentioned kit.

According to yet another aspect of the present invention, there is also provided a method of assembling components of the above-mentioned kit and/or set.

According to yet another aspect of the present invention, there is also provided a method of doing business with the above-mentioned cable drive unit, assembly, plant, kit, set and/or method(s).

The objects, advantages, and other features of the present invention will become more apparent upon reading of the following non-restrictive description of preferred embodiments thereof, given for the purpose of exemplification only, with reference to the accompanying drawings.

DETAILED DESCRIPTION OF PREFERRED EMBODIMENTS OF THE INVENTION

Figure 1:
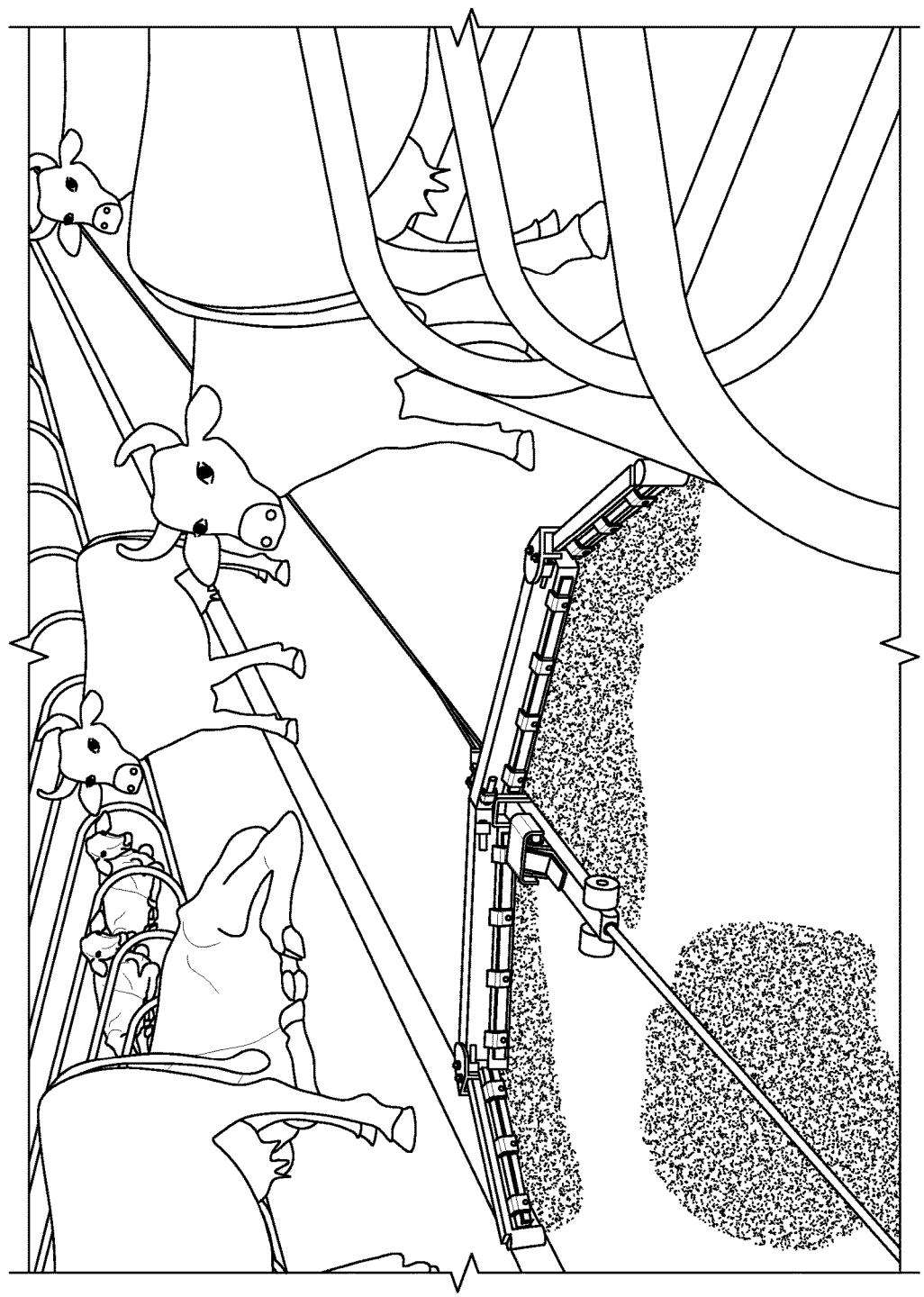
FIGS. 1-8 are different views of a cable drive unit and/or of corresponding components/accessories thereof according to the prior art.
Figure 2:
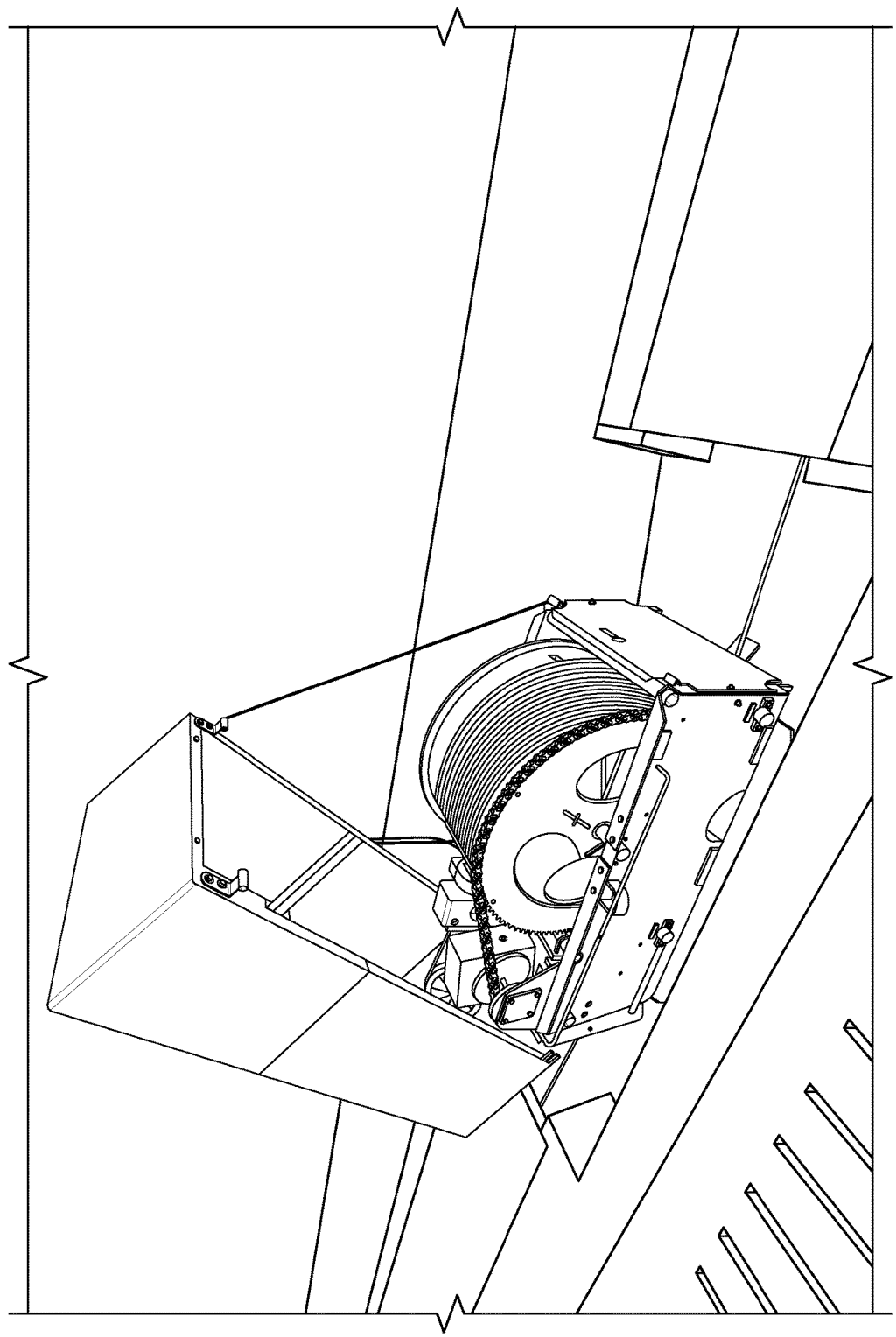
Figure 3:
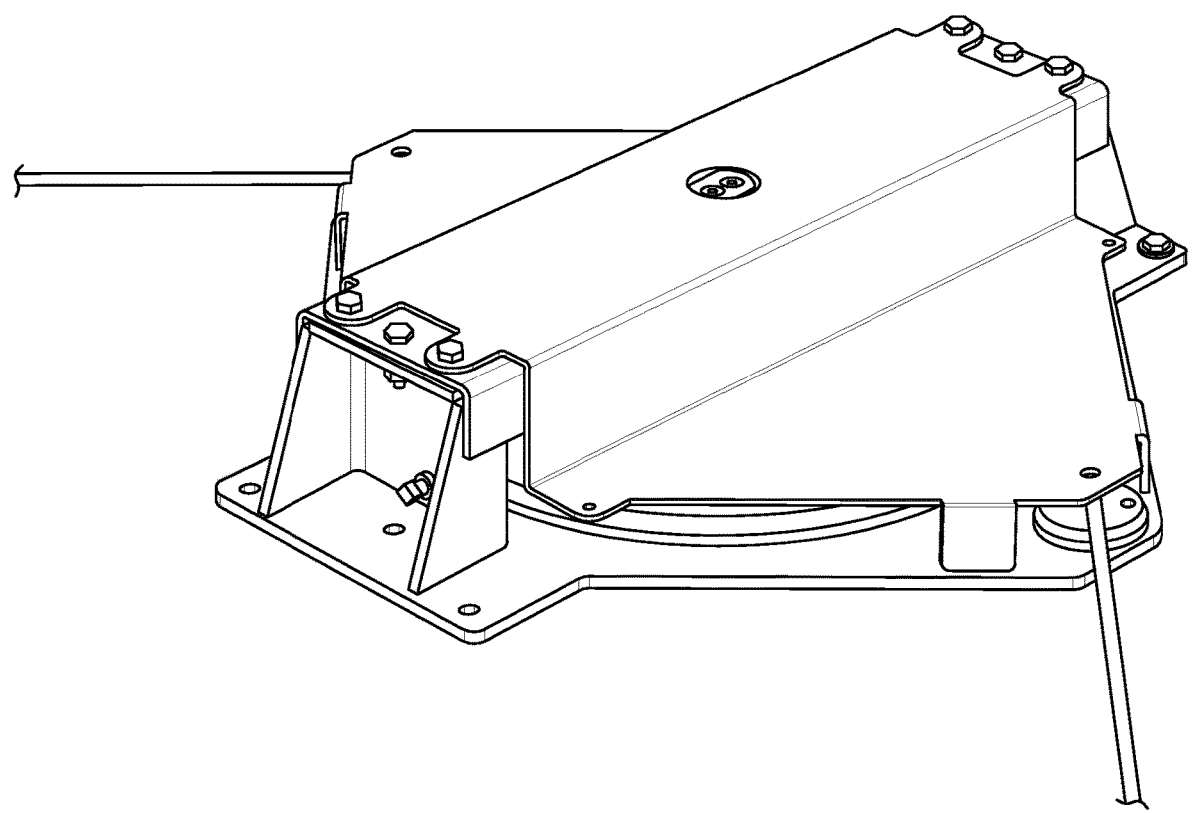
Figure 4:
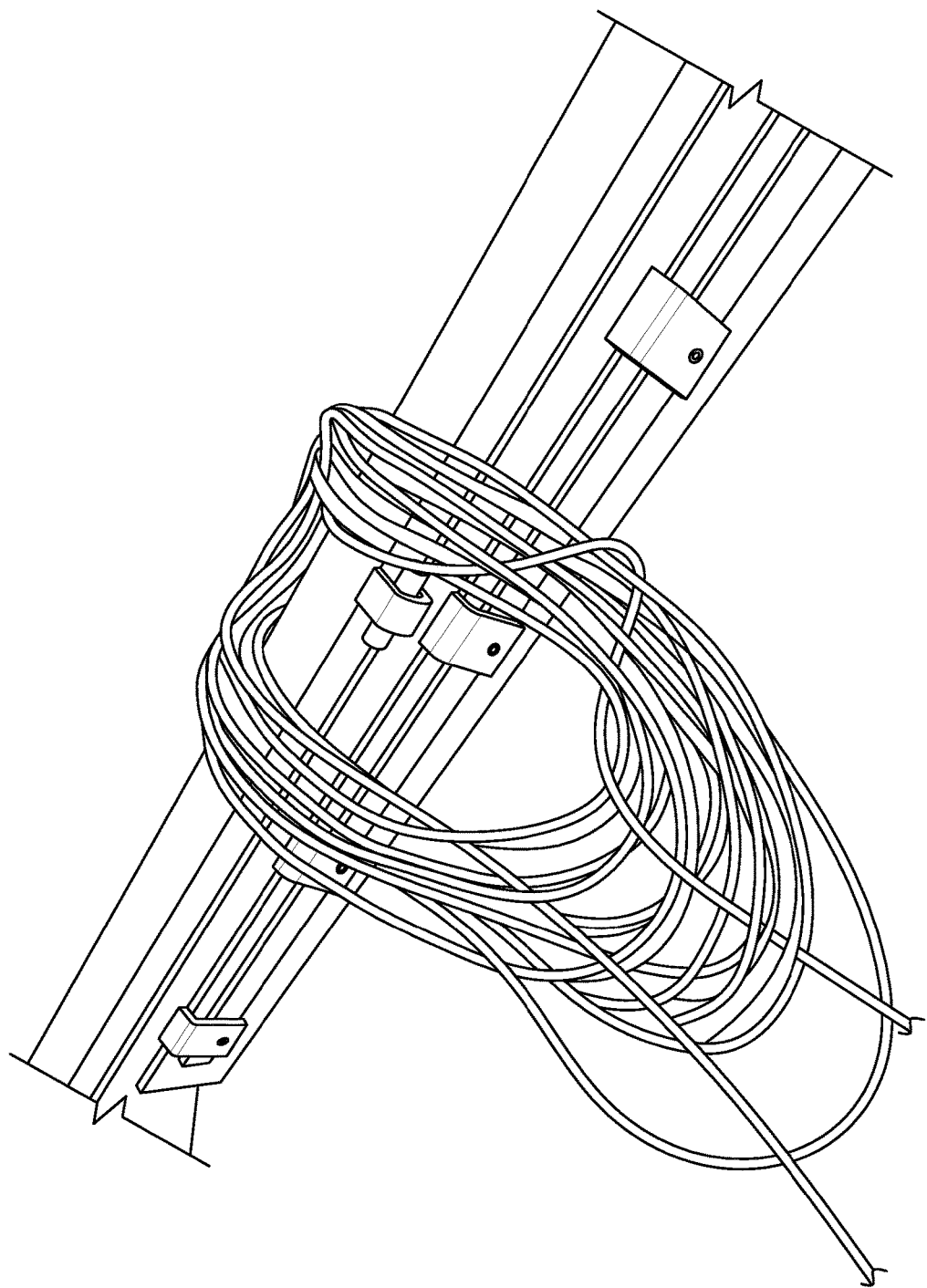
Figure 5:
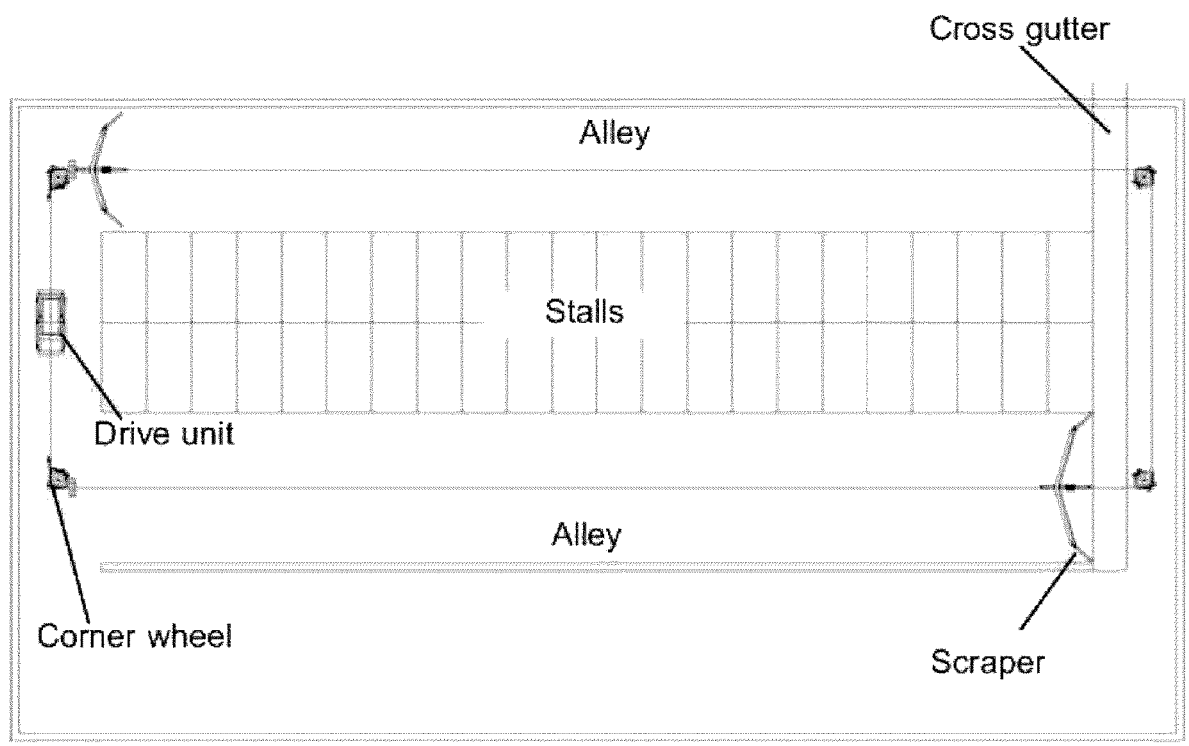
Figure 6:
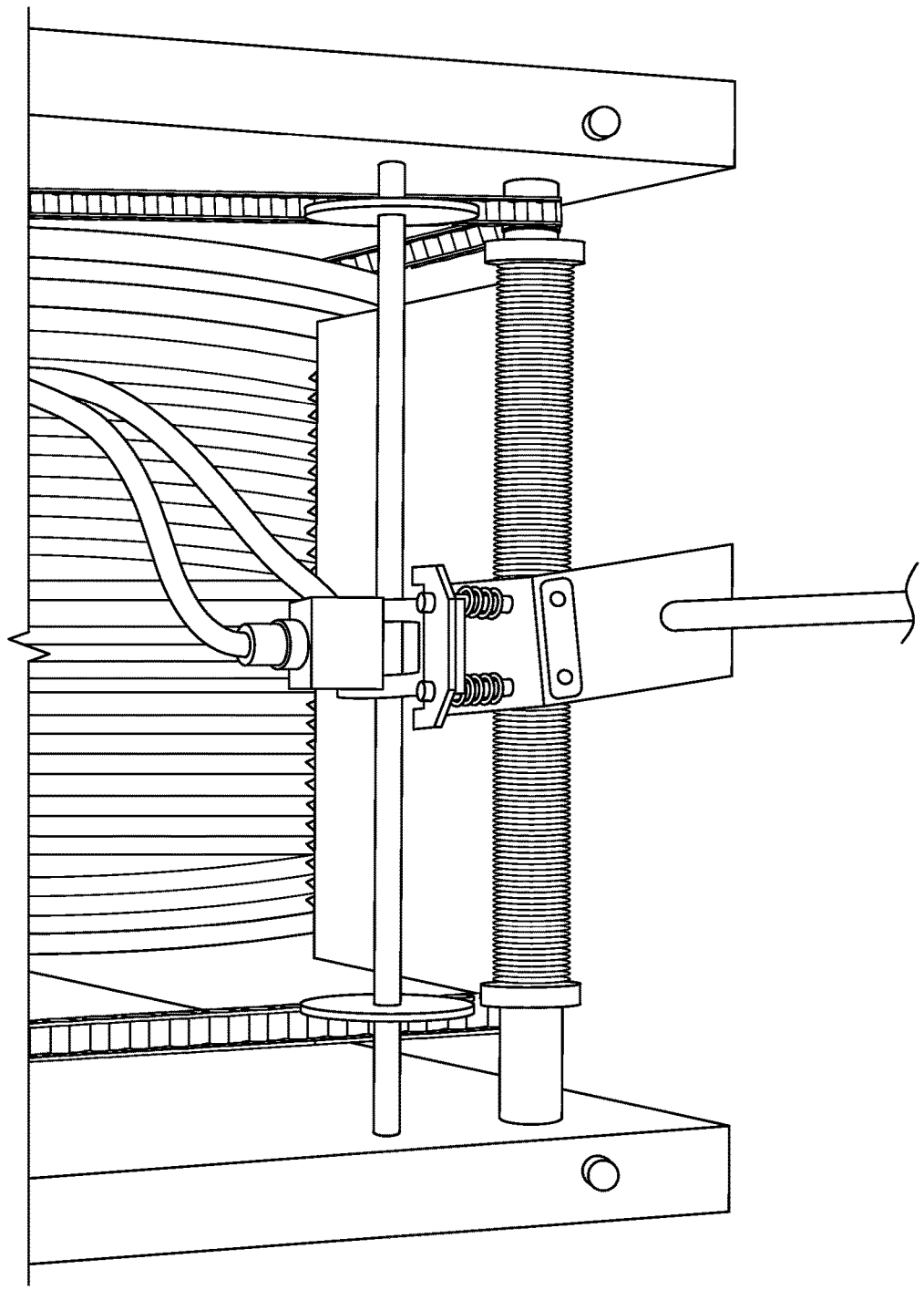
Figure 7:
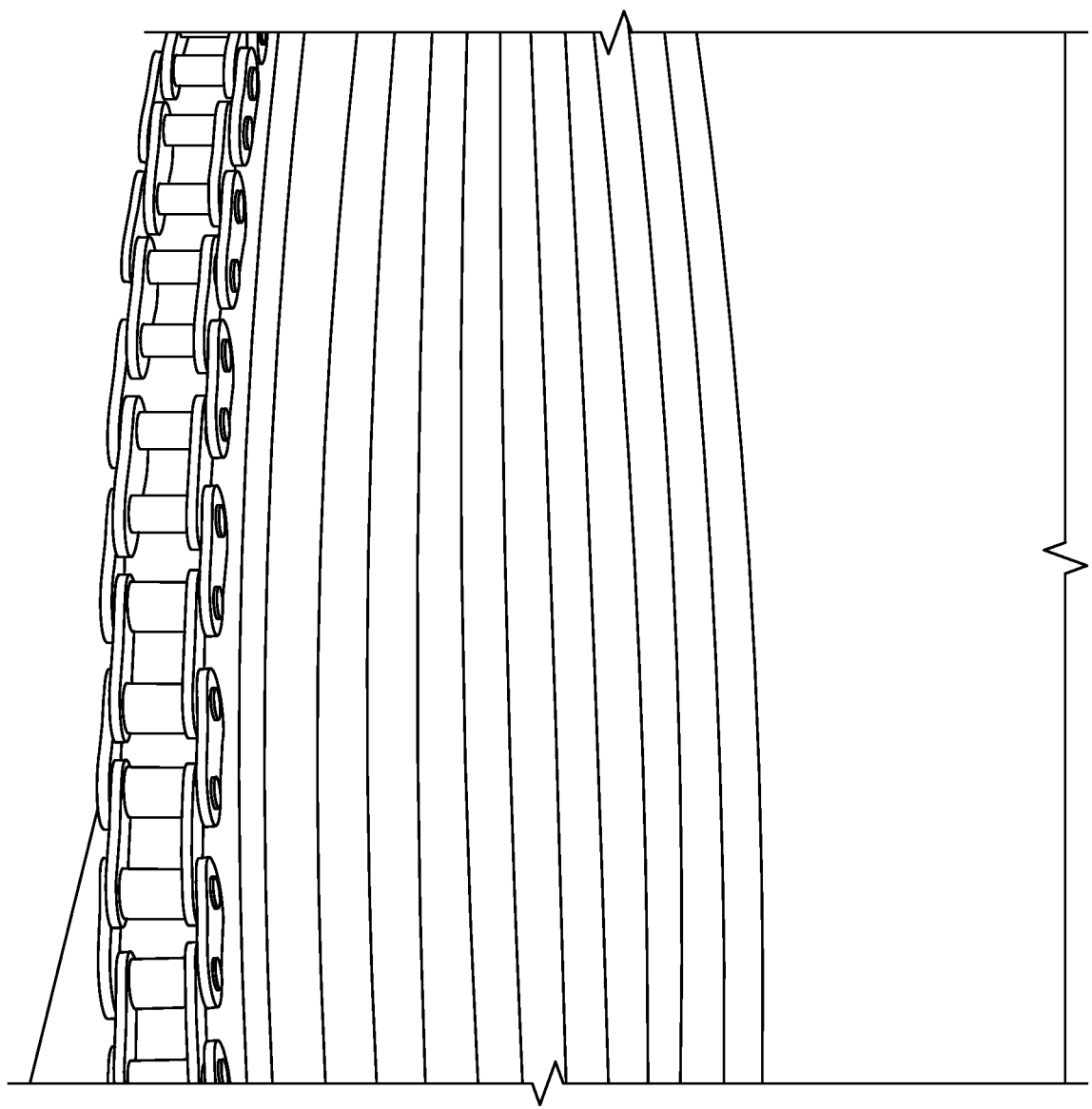
Figure 8:
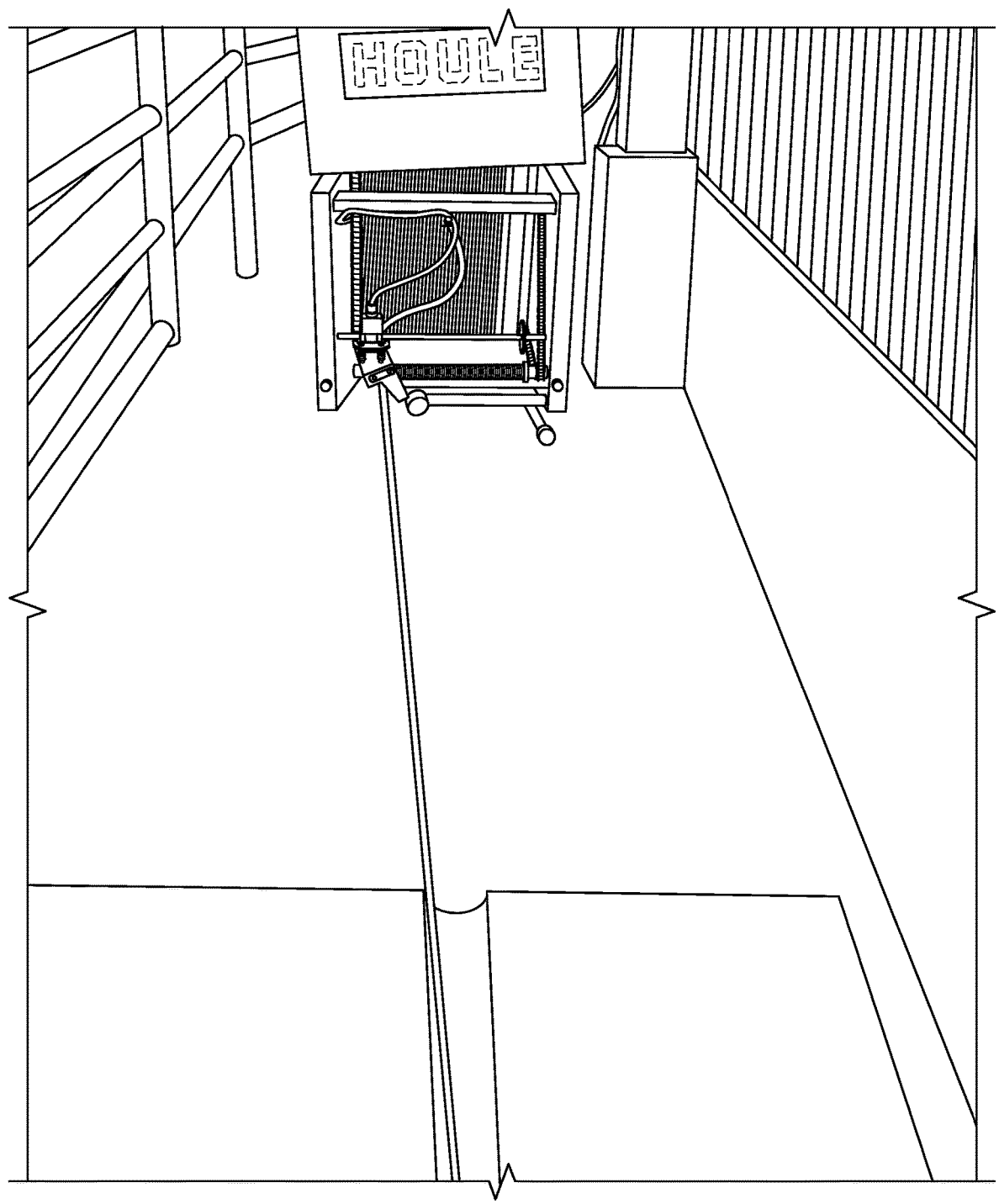

In the following description, the same numerical references refer to similar elements. Furthermore, for sake of simplicity and clarity, namely so as to not unduly burden the figures with several references numbers, only some figures have been provided with reference numbers, and components and features of the present invention illustrated in other figures can be easily inferred therefrom. The embodiments, geometrical configurations, materials mentioned and/or dimensions shown in the figures are preferred, for exemplification purposes only.

Moreover, although the present invention was primarily designed for use with a cable cooperating with a cable drive unit, preferably such as the ones used for cleaning stalls in farms, barns and/or the like, it may be used with other objects and/or in other types of applications, as apparent to a person skilled in the art. For this reason, expressions such as "cable", "stall", "cleaner", "farm", "barn", "cow", etc., used herein should not be taken so as to limit the scope of the present invention and include all other kinds of objects and/or applications with which the present invention could be used and may be useful.

Moreover, in the context of the present invention, the expressions "unit", "cleaner", "device", "system", "assembly", "product", as well as any other equivalent expressions and/or compounds word thereof known in the art will be used interchangeably, as apparent to a person skilled in the art. This applies also for any other mutually equivalent expressions, such as, for example: a) "cable", "rope", "link", "connector", etc.; b) "displace", "travel", "move", "roll", "slide", "translate", "glide", etc.; c) "lateral", "traversal", "across", "angled", etc.; d) "worm", "gear", etc.; e) "row", "segment", "portion", etc.; f) "rail", "track", etc.; g) "plant", "farm", "barn", etc.; h) "traversal", "transversal", "perpendicular", "across", "crossing", etc.; i) "wind", "wrap", "roll", "coil", etc.; as well as for any other mutually equivalent expressions, pertaining to the aforementioned expressions and/or to any other structural and/or functional aspects of the present invention, as also apparent to a person skilled in the art.

Furthermore, in the context of the present description, it will be considered that all elongated objects will have an implicit "longitudinal axis" or "centerline", such as the longitudinal axis of a shaft, or the centerline of a cable when in an extended configuration, for example (and as a result, there is a "transversal axis" being substantially "perpendicular" for each longitudinal axis, etc.), and that expressions such as "connected" and "connectable", or "mounted" and "mountable", may be interchangeable, in that the present invention also relates to a kit with corresponding components for assembling a resulting fully assembled and operational cable drive unit (and/or a resulting assembly and/or plant (ex. farm, barn, layout, etc.) including the same).

In addition, although the preferred embodiments of the present invention as illustrated in the accompanying drawings comprise various components, and although the preferred embodiments of the cable drive unit (1) and corresponding parts as shown consist of certain geometrical configurations as explained and illustrated herein, not all of these components and geometries are essential to the invention and thus should not be taken in their restrictive sense, i.e. should not be taken so as to limit the scope of the present invention. It is to be understood, as also apparent to a person skilled in the art, that other suitable components and cooperation thereinbetween, as well as other suitable geometrical configurations may be used for the cable drive unit (1) and corresponding parts according to the present invention, as will be briefly explained herein and as can be easily inferred herefrom by a person skilled in the art, without departing from the scope of the present invention.

Broadly described, and as better exemplified in the accompanying drawings, the present invention relates to a cable drive unit (1) with improved shape, components and features enabling for better, easier, more convenient, more reliable and more durable cable driving/winding applications.

LIST OF NUMERICAL REFERENCES FOR SOME OF THE CORRESPONDING POSSIBLE COMPONENTS ILLUSTRATED IN THE ACCOMPANYING DRAWINGS 1. cable drive unit
3. base frame
5. support frame
7. displacement assembly
9. drum
11. cable
13. transmission assembly
15. shaft (of drum)
17. worn gear
19. fixed component (of base frame)
21. chain
23. first gear
25. second gear
27. chain tensioner
29. rail
31. wheel
33. circumferential groove (of wheel)
35. side edge (of rail)
37. V-shaped bar (of rail)
39. axis of rotation (of wheel)
41. bottom portion (of support frame)
43. peripheral surface (of drum)
45. toothed peripheral edge (of drum)
47. driving assembly
49. range-limiting assembly
51. plate (of range-limiting assembly)
51a. first plate (of range-limiting assembly)
51b. second plate (of range-limiting assembly)
53. switch
55. chain guide
57. panel(s)
59. accessory (of cable drive unit)
61. recessed row (of drum)
101. free stall cleaning system As will be easily understood, the present cable drive unit (1) is particularly advantageous in that, by virtue of its design, components and features, exemplified in the accompanying drawings, it enables to eliminate (or at the very least, to substantially reduce) friction with the cable (11) while making sure to keep proper alignment of the cable (11) during operation (winding, pulling, etc.) of the cable drive unit (1).

Efforts of the Applicant have been focused on the longevity of the cable (11) due to the high cost of replacement part(s). Thus, an object of the present invention is to eliminate friction as much as possible to prevent cable wear, and to provide a new cable winding method that could avoid or at the very least substantially reduce friction.

Figure 9:
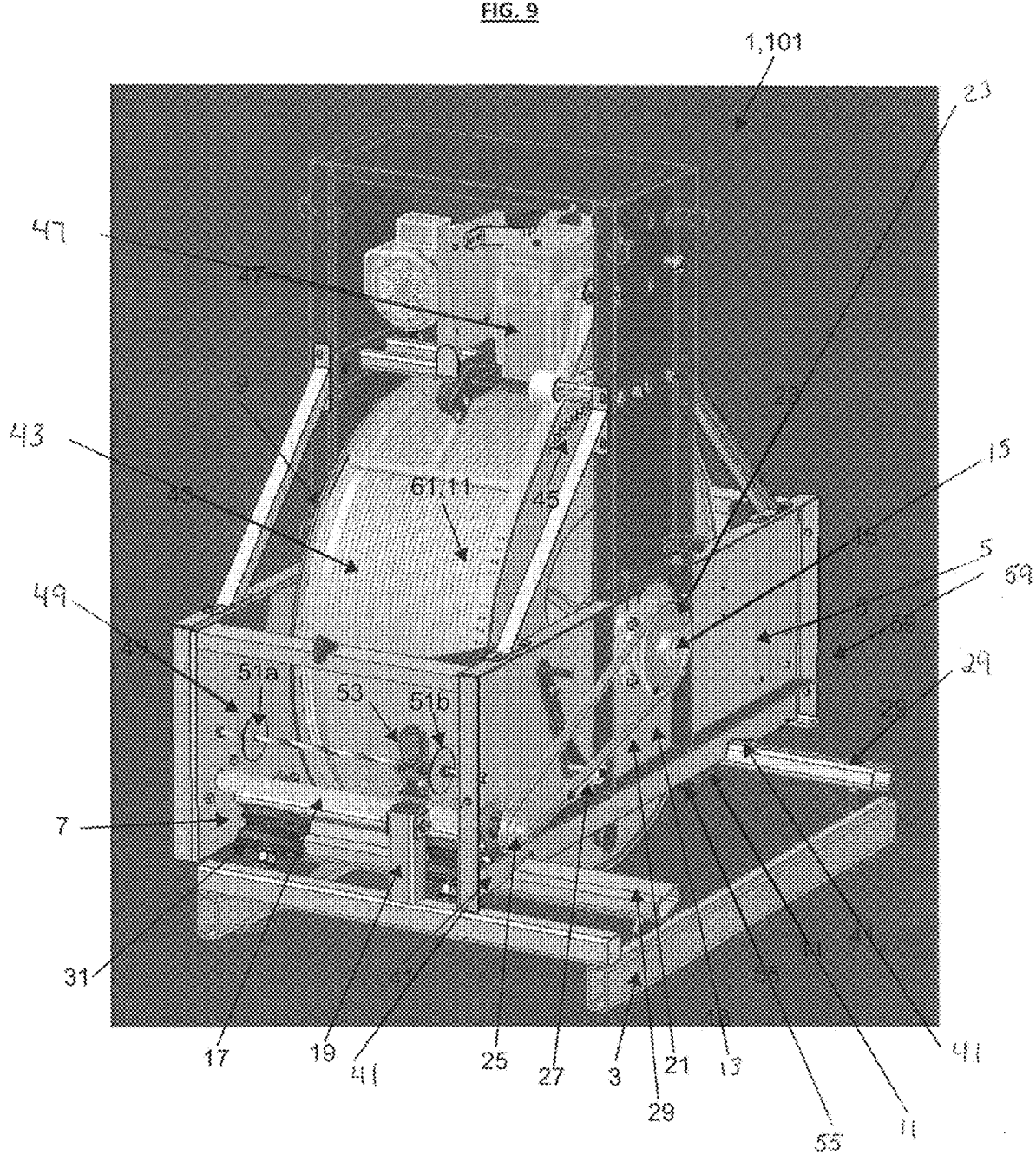
FIGS. 9-24 are different views of a cable drive unit and/or of corresponding components/accessories thereof according to possible embodiments of the present invention, certain views being shown with some of the outer components/panels of the cable drive unit having been removed to better illustrate inner components and features of the cable drive unit.

As will be better understood when referring to the present description and accompanying drawings, namely FIG. 9 for example, an important feature of the present cable drive unit (1) is that it is designed so that the drive unit frame, also referred herein as "support frame" (5), "moves" with respect to the base frame (3) via a corresponding displacement assembly (7), in order to align the cable (11) with respect to the drum (9) as the cable (11) is wound and/or unwound, instead of having a "fixed frame" where the cable (11) moves continuously from "left" to "right" (and vice-versa) by means of a "cable guide", as is the case with conventional systems.

Figure 10:
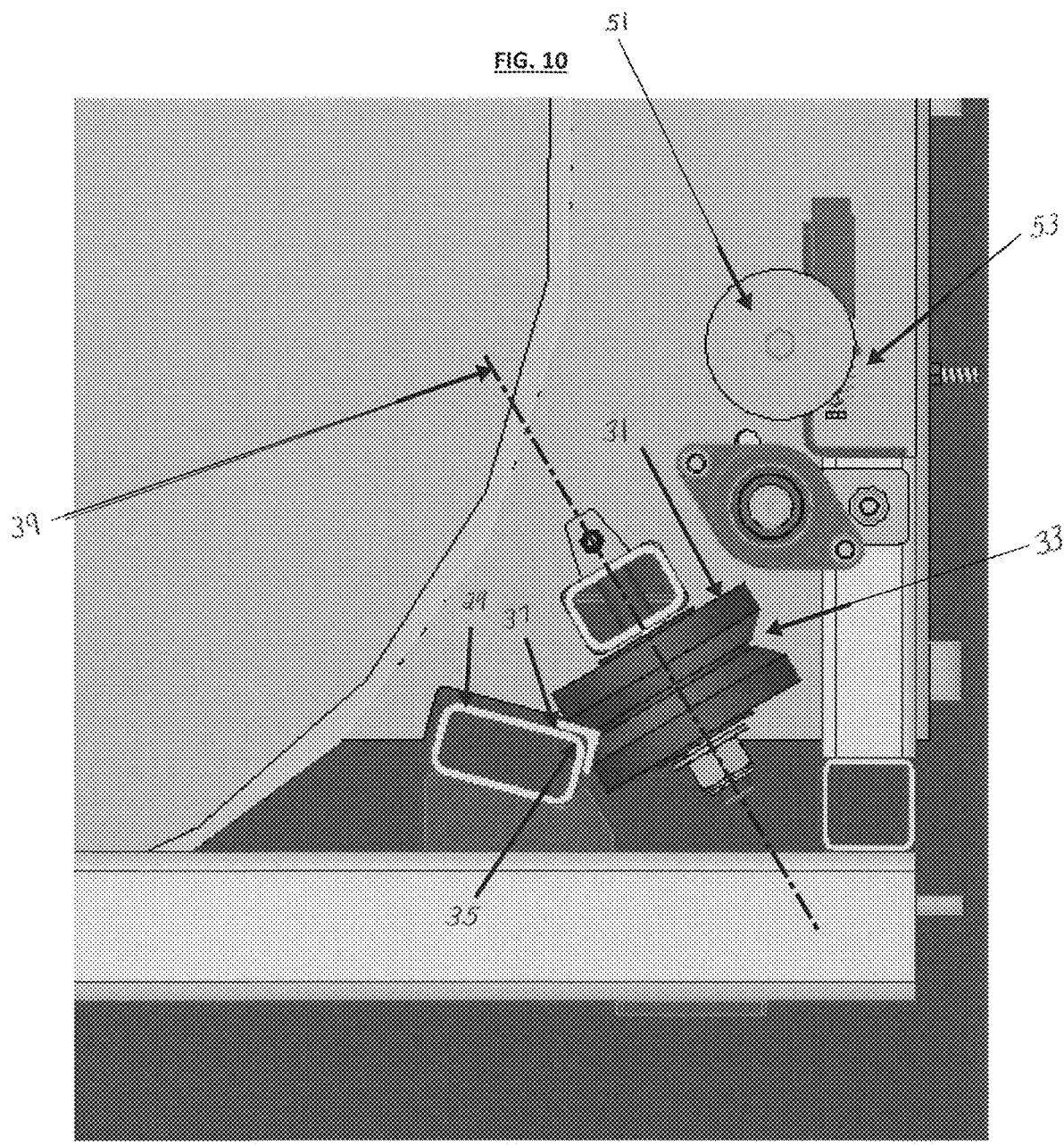
Figure 11:
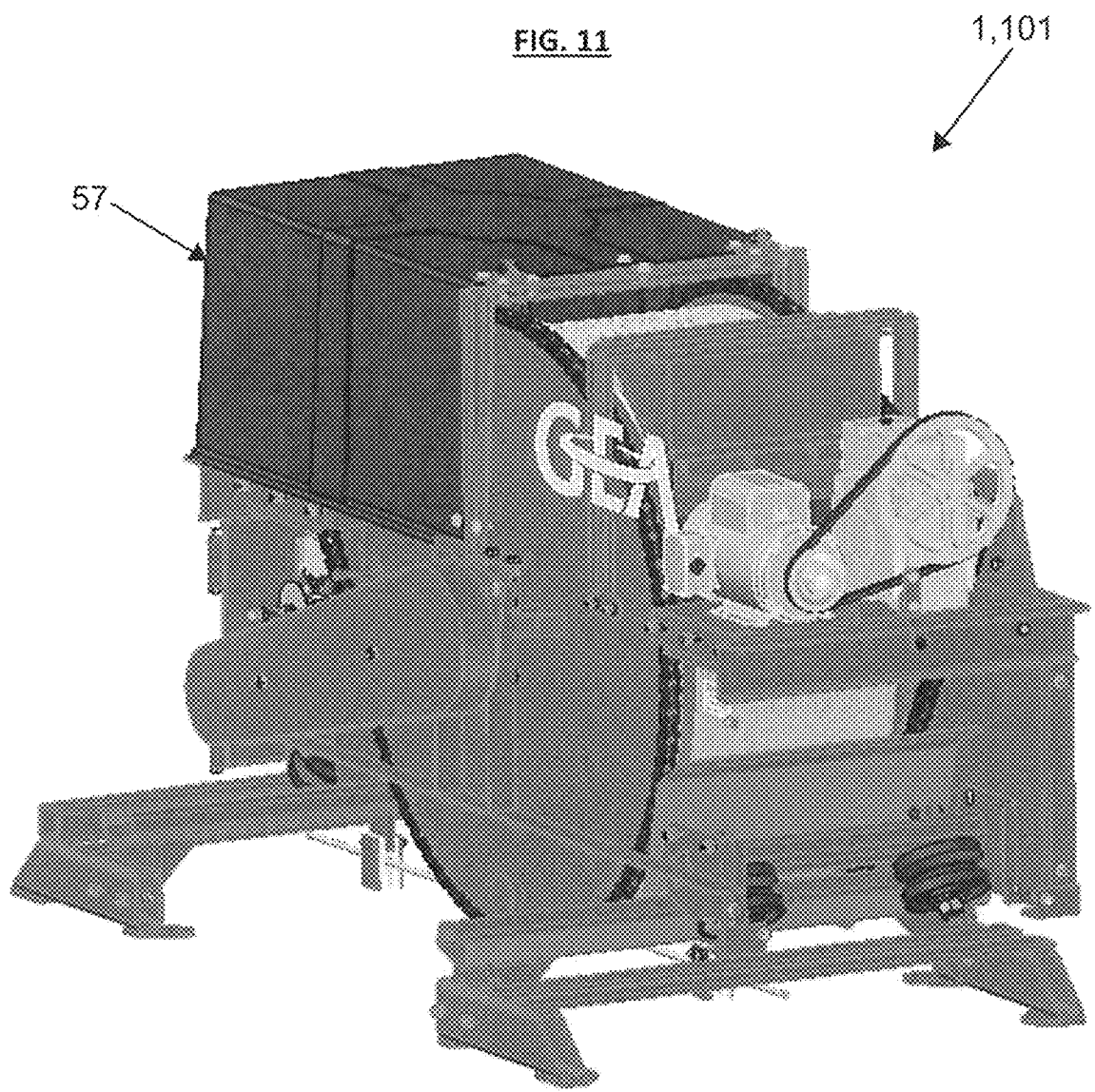
Figure 12:
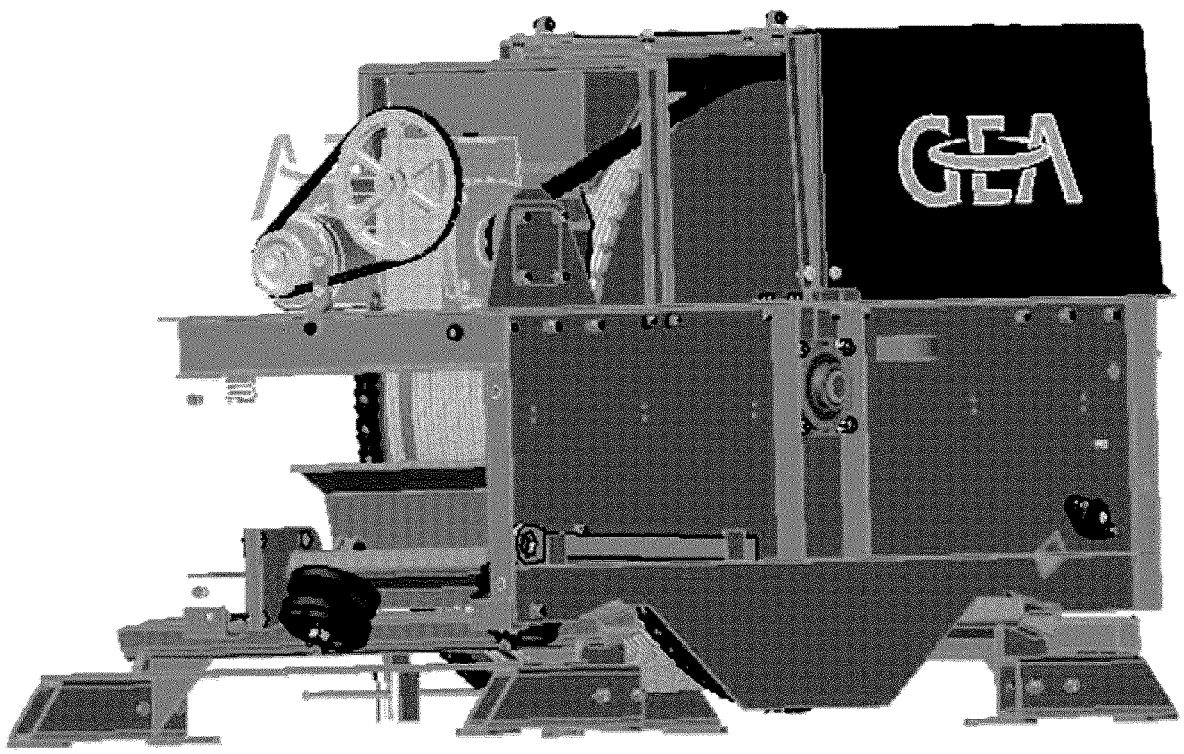
Figure 13:
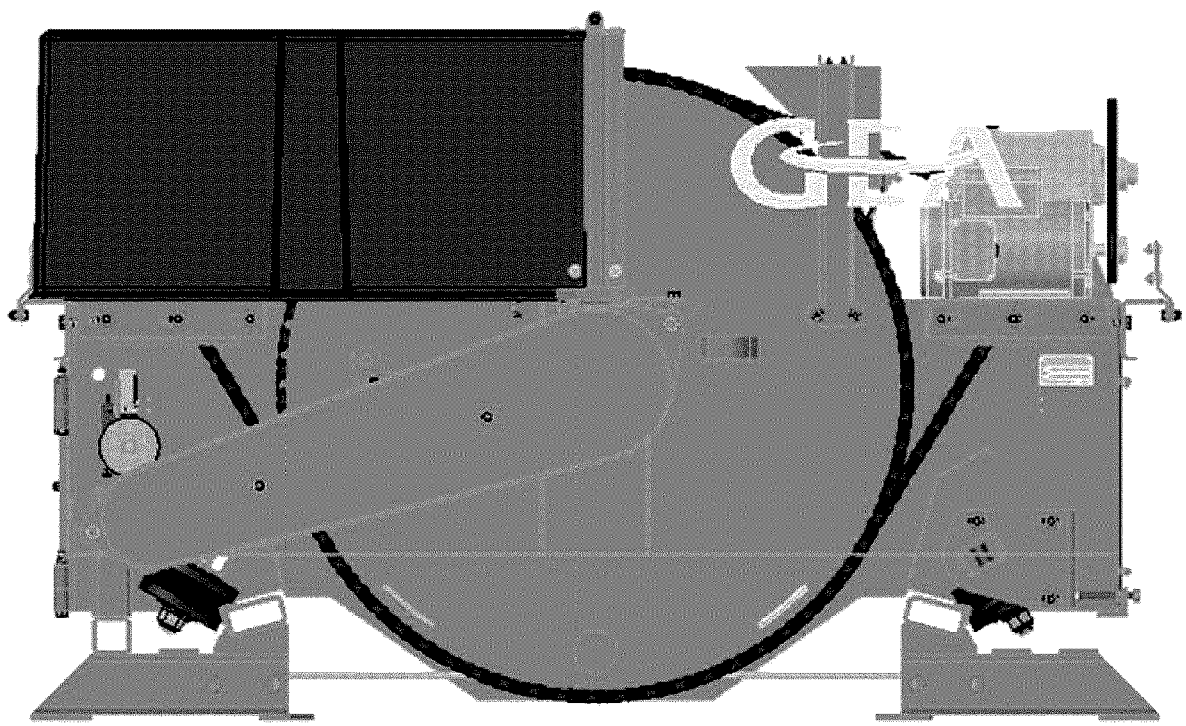
Figure 14:
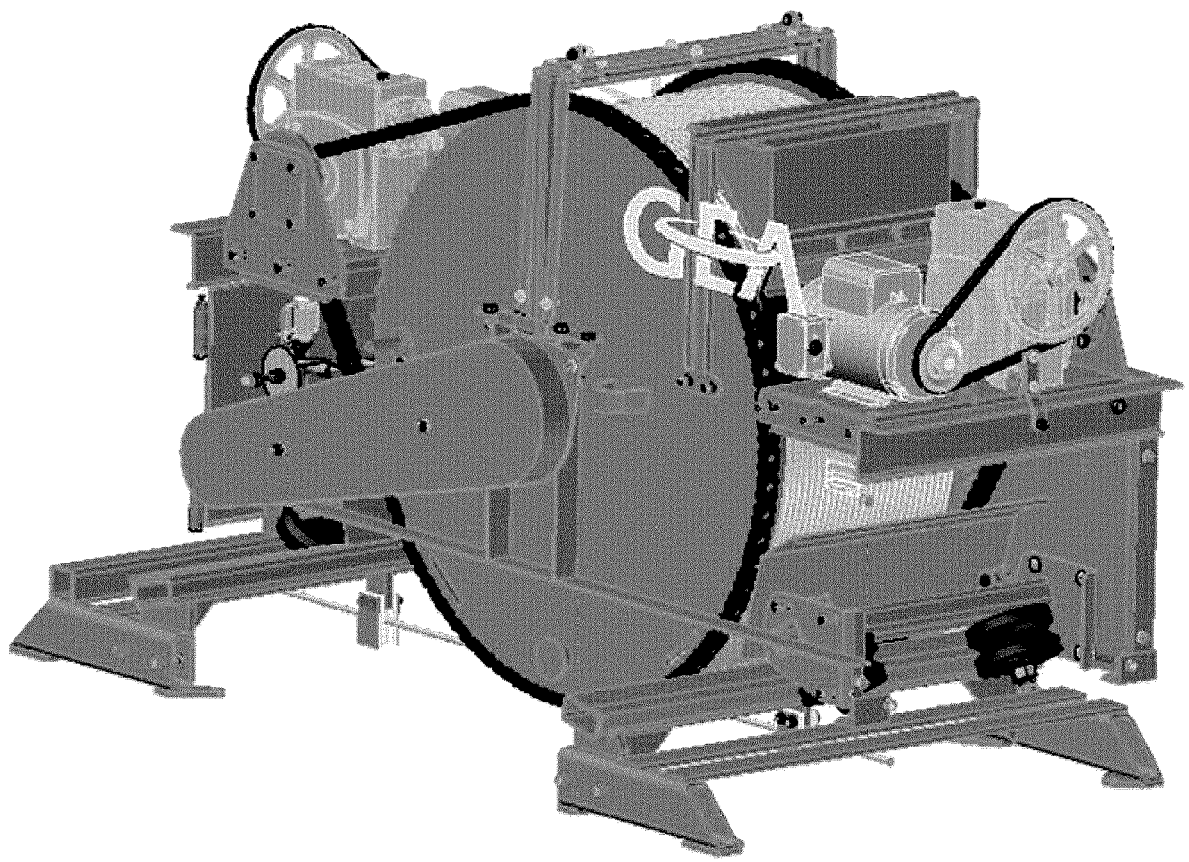
Figure 15:
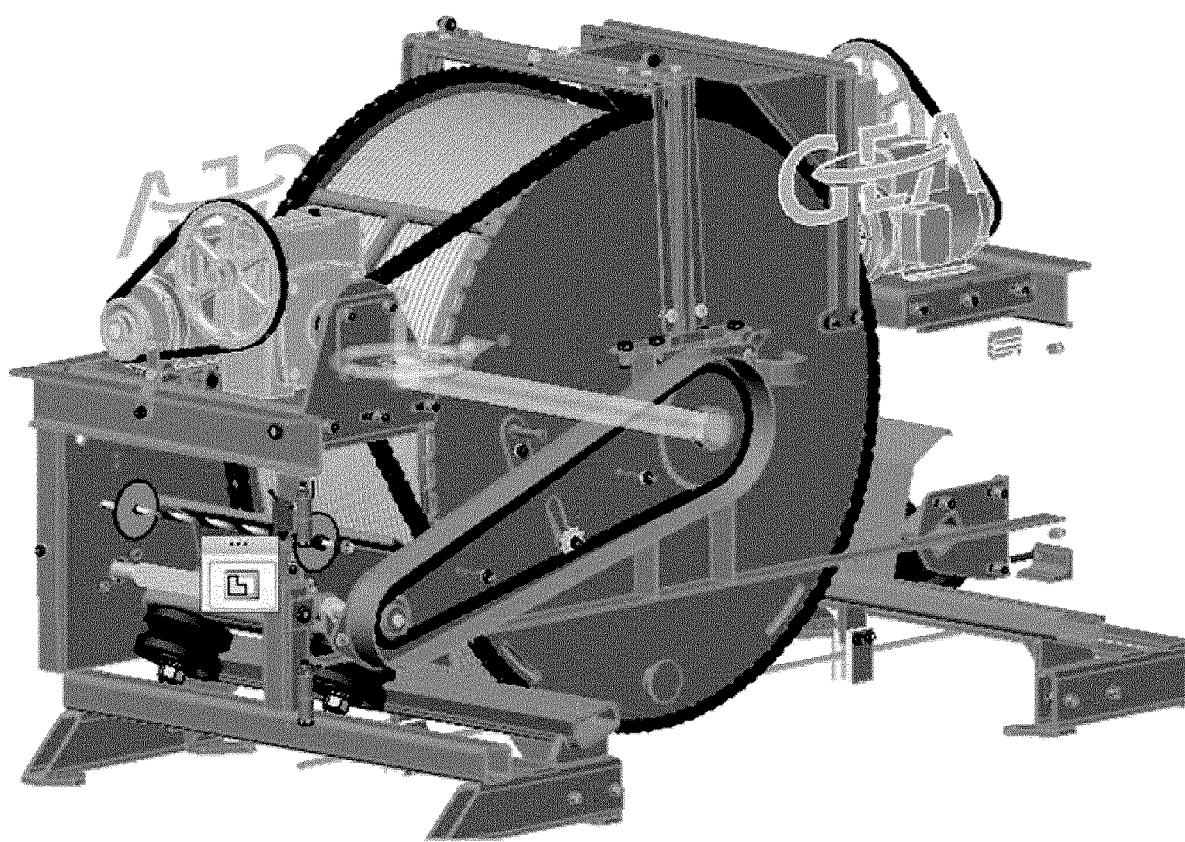
Figure 16:
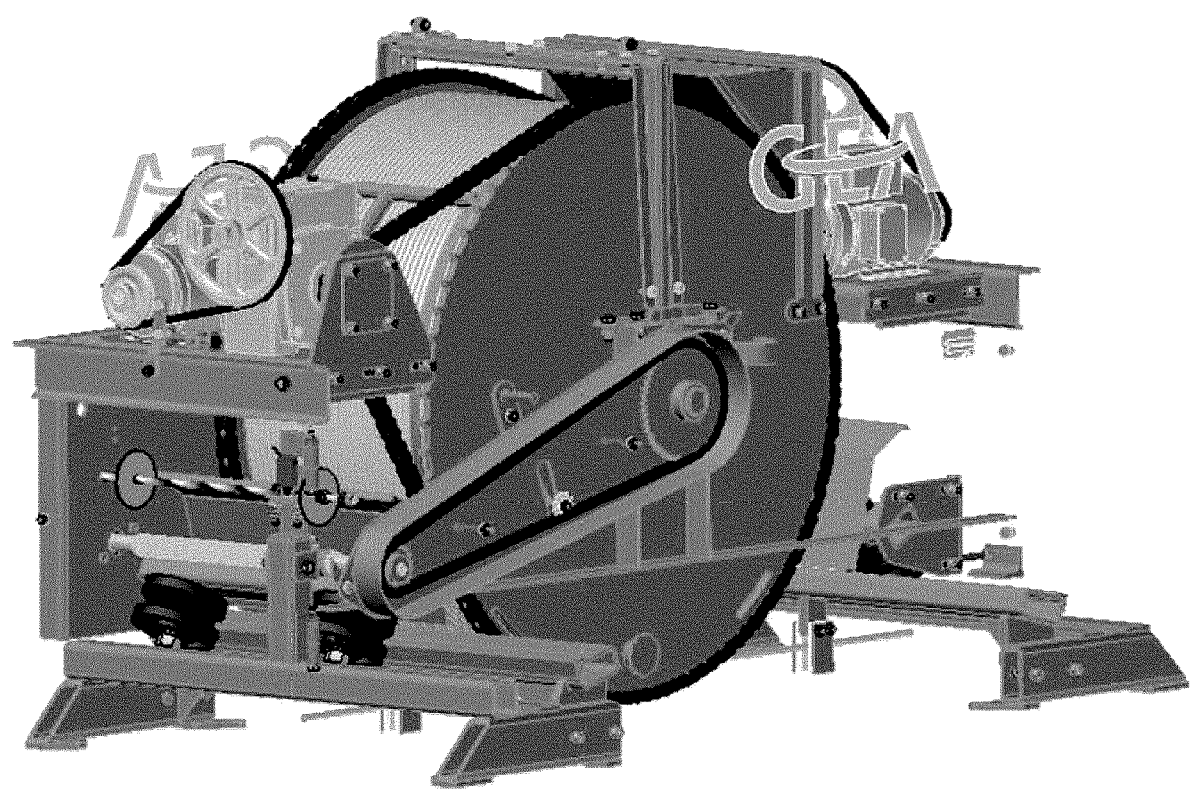
Figure 17:
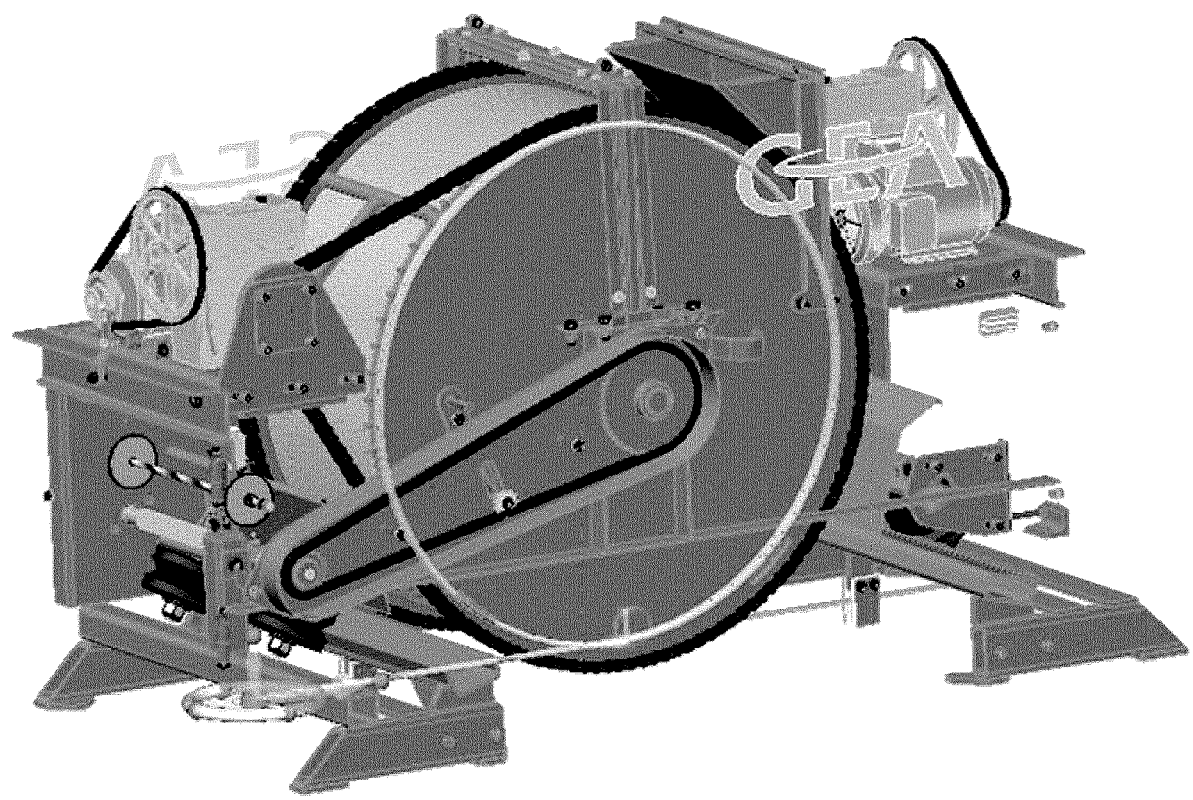
Figure 18:
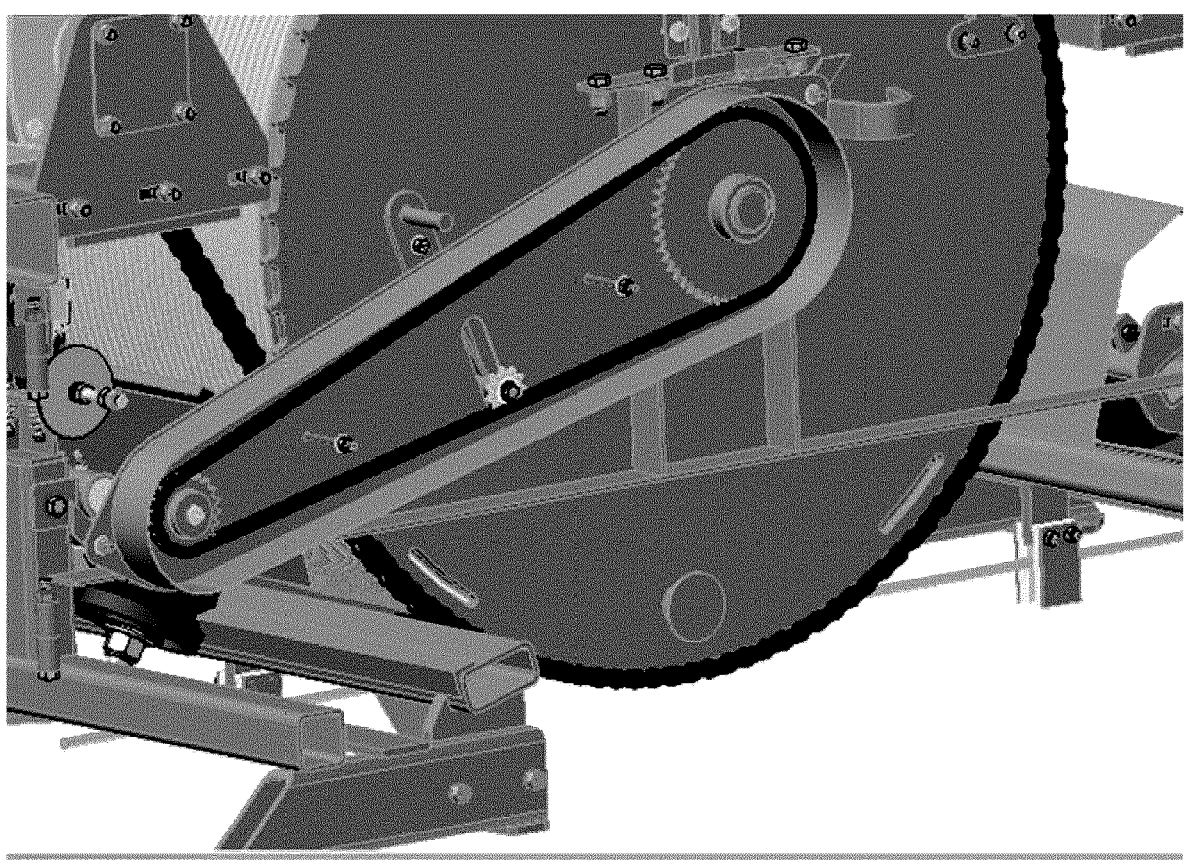
Figure 19:
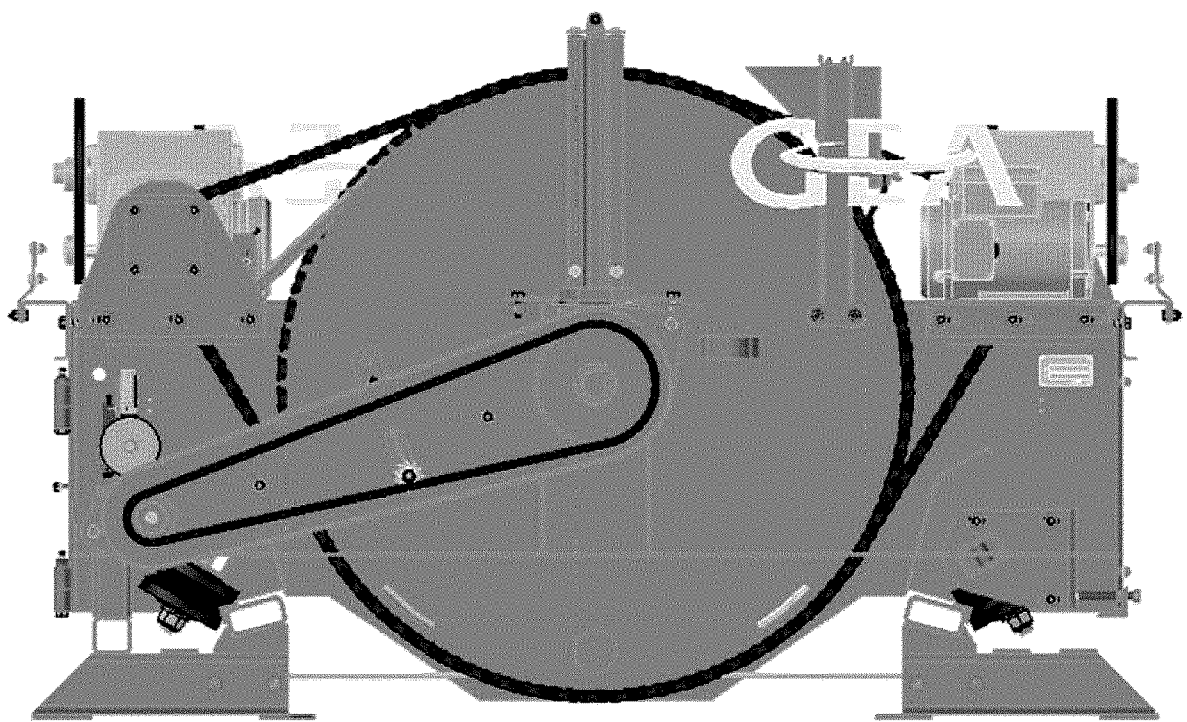
Figure 20:
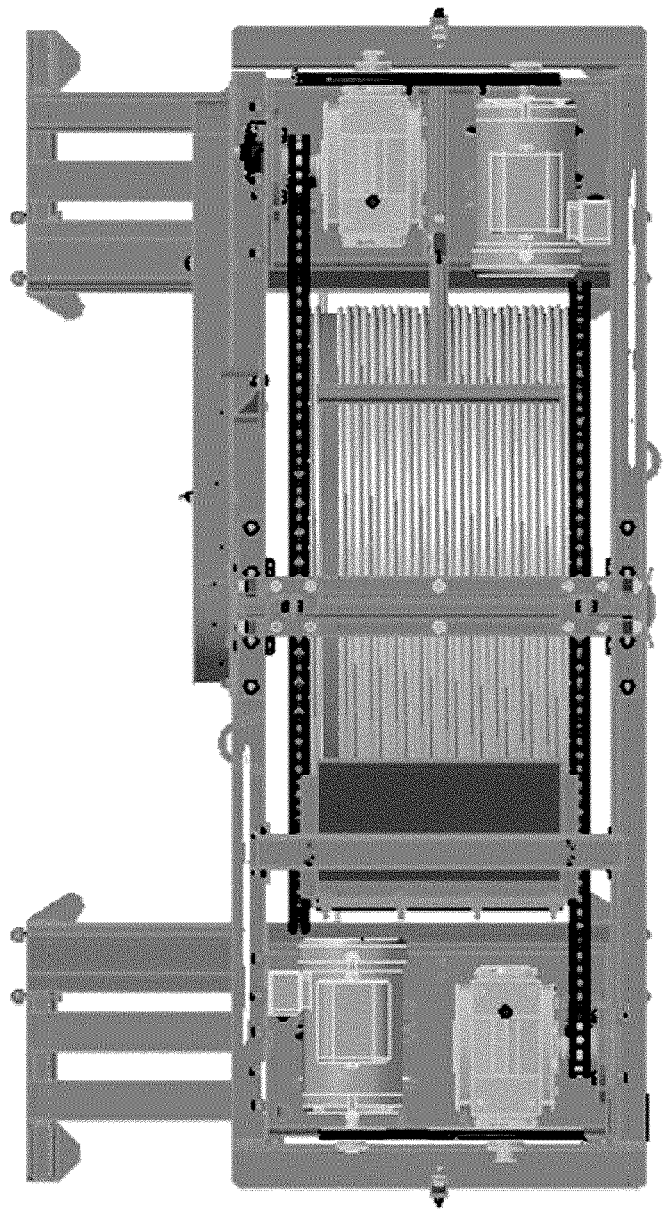
Figure 21:
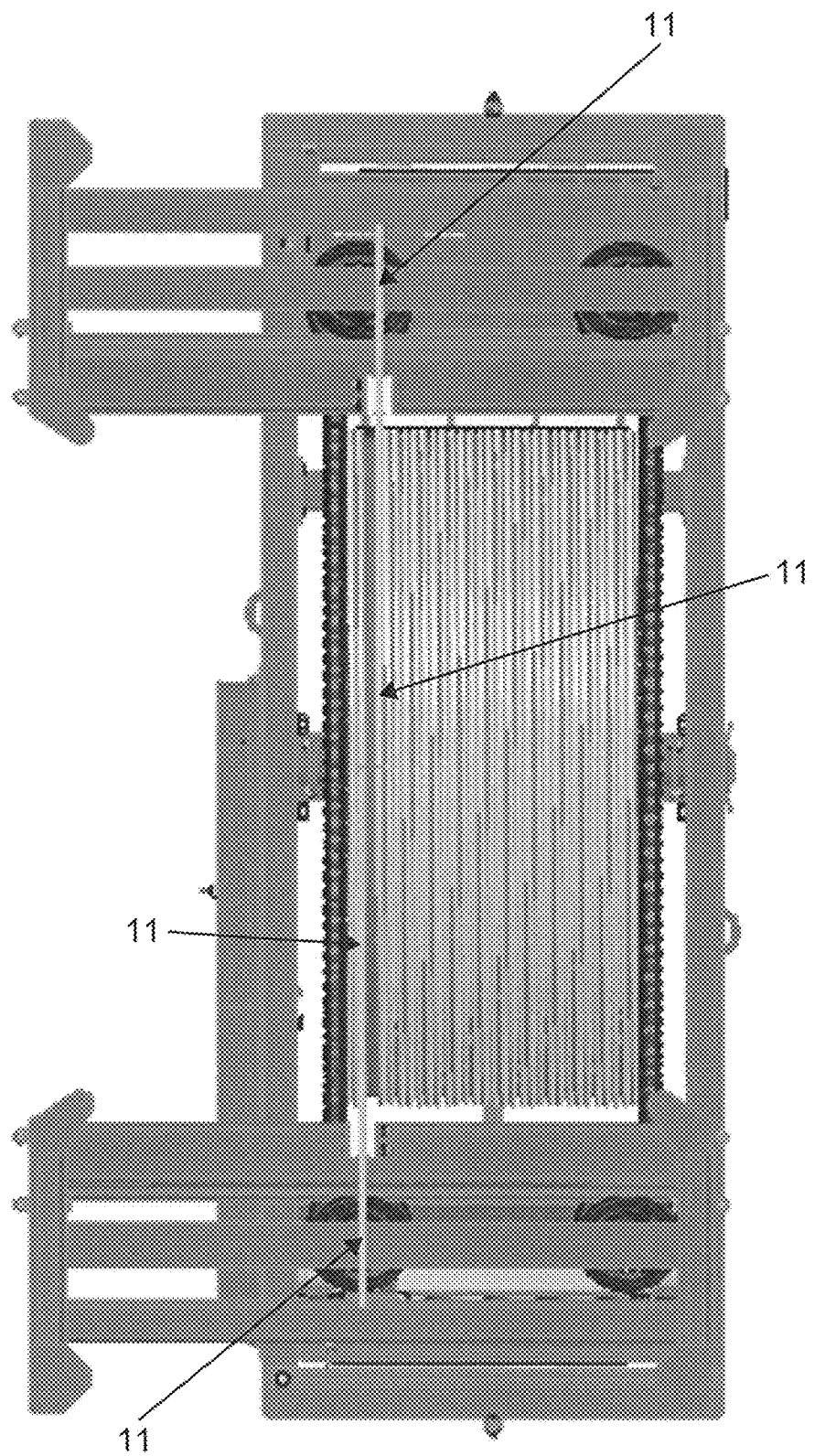
Figure 22:
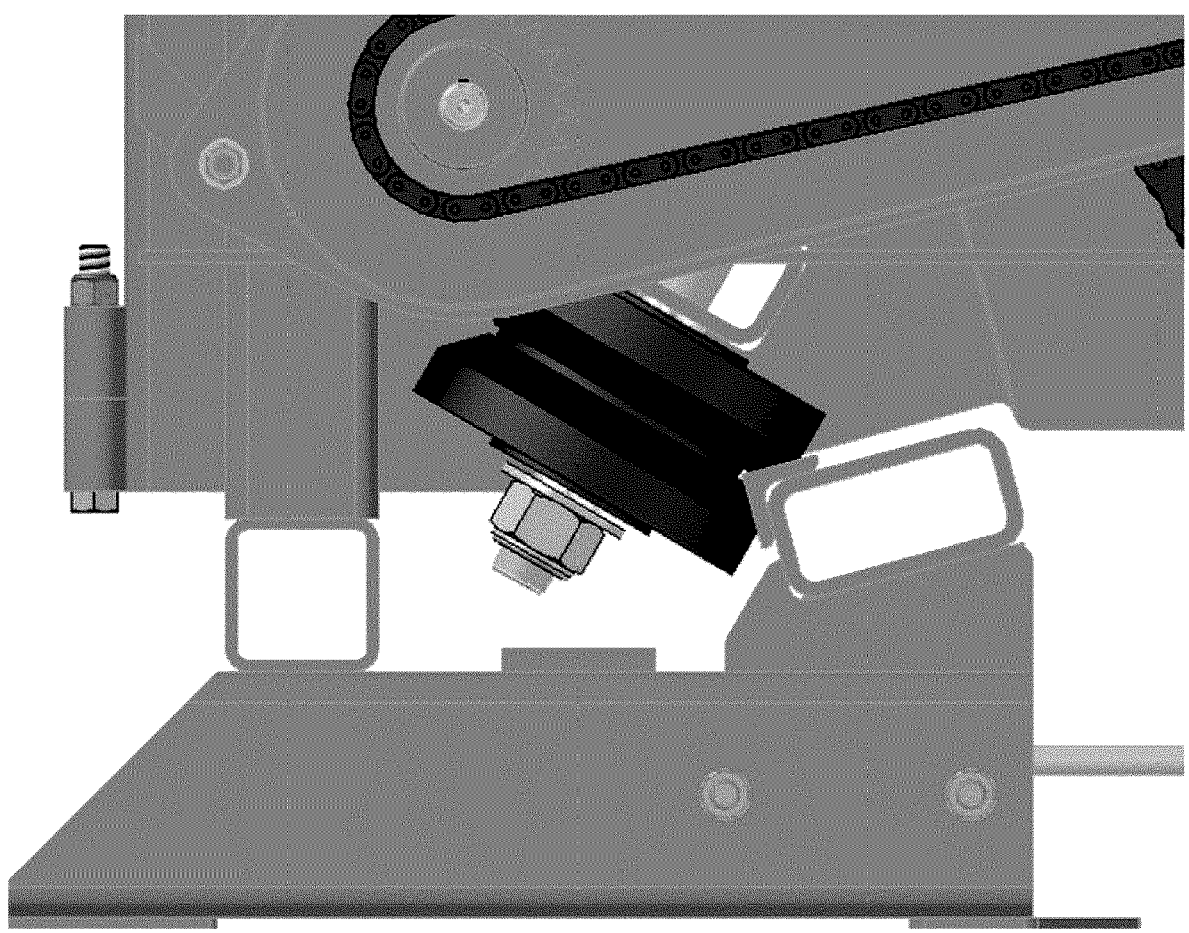
Figure 23:
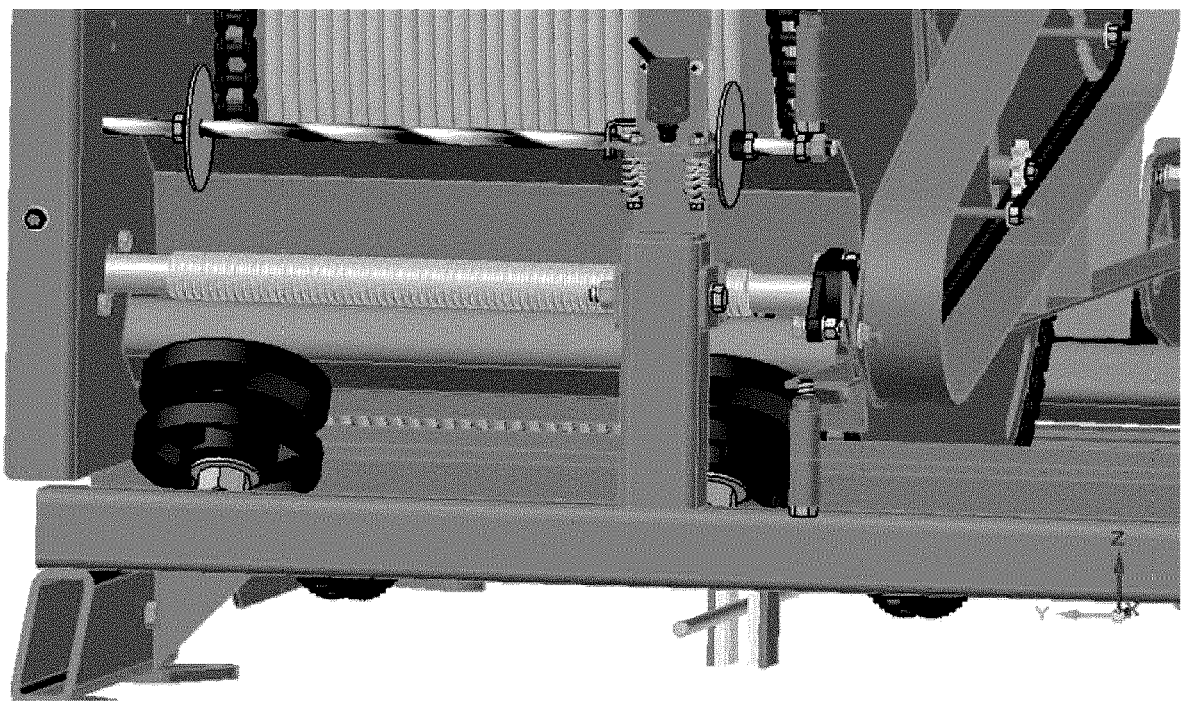
Figure 24:
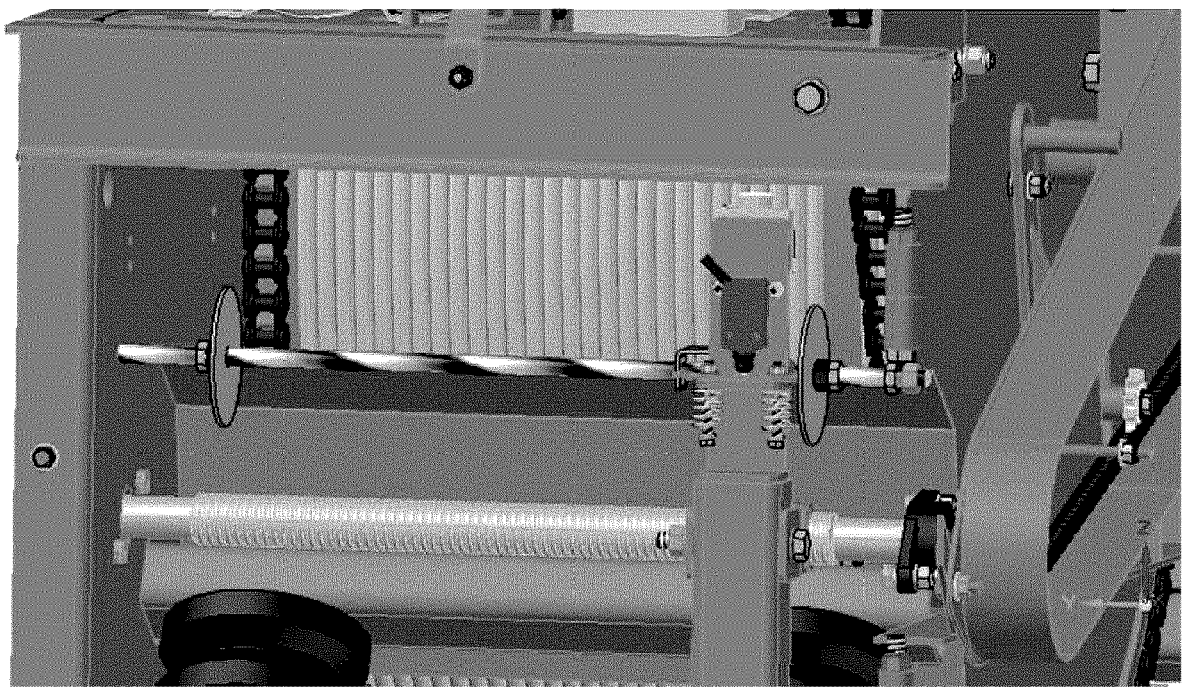

According to one possible embodiment, as exemplified in FIG. 10, the base frame (3) is fixed on the floor and the drive unit (1) moves with respect to the base frame (3) by means of a displacement assembly (7) which may be driven by chain, sprocket and/or a worm shaft, for example. With this particular design, the friction between the cable (11) and other parts is eliminated and/or substantially reduced.

The cable drive unit (1) may come in the form of a cable drive unit (1) including one and/or several of the following possible components and features (and/or different combination(s) thereof):

According to one possible embodiment, the cable drive unit (1) may comprise a base frame (3), a support frame (5) being displaceable with respect to the base frame (3) via a corresponding displacement assembly (7), and a drum (9) pivotably mountable about the support frame (5) and displaceable therewith for receiving a cable (11) to be wound about said drum (9).

According to another possible embodiment, the cable drive unit (1) may comprise a base frame (3), a support frame (5) operatively mountable onto the base frame (3), and being laterally displaceable with respect to said base via a corresponding displacement assembly (7), and a drum (9) pivotably mountable about the support frame (5) for receiving a cable (11) to be wound about said drum (9).

Indeed, as can be easily understood, and according to optional embodiments of the present invention, it is the "drum" (9) about which the cable (11) is wound and/or unwound that is "displaced" during operation of the drive unit (1) so that the cable (11) to be wound and/or unwound is kept in a substantially fixed and optimal configuration, contrary to conventional drive units where the drum is "fixed", and the cable is continuously moving from one side to another, via a wide range of significant angles, and forcefully with a "chain guide" pushing onto said cable, causing premature ware and other undesirable drawbacks.

As can be easily understood, and according to the present invention, the way in which the drum (9) is displaced in a reciprocating (ex. back-and-forth, etc.) motion with respect to the base frame (3) can be varied, and different components and features could be used to accomplish this displacement of the support frame (5) and corresponding drum (9) pivotally mountable thereabout, during operation of the cable drive unit (1).

According to one possible embodiment, the cable drive unit (1) may comprise a transmission assembly (13) operatively connectable between a shaft (15) of the drum (9) and the displacement assembly (7), the transmission assembly (13) being configured for displacing the support frame (5) and corresponding drum (9) with respect to the base frame (3) by a certain displacement for every rotational displacement of the drum (9).

Displacement (ex. lateral displacement, and/or other) of the support frame (5) with respect to the base frame (3) can be done in a gradual/progressive manner, or alternatively, lateral displacement of the support frame (5) with respect to the base frame (3) could be done incrementally (ex. in small increments, in a stepped manner, etc.).

Either way, and preferably, displacement of the support frame (5) with respect to the base frame (3) is done so as to be synchronized with a rotational displacement of the drum (9).

According to an optional embodiment, displacement of the support frame (5) with respect to the base frame (3) is done so as to be synchronized with a rotational displacement of the drum (9) via a corresponding transmission ratio or step of the transmission assembly (13).

As exemplified in the accompanying drawings, the transmission assembly (13) may comprise a worm gear (17) pivotally mountable about the support frame (5) within a given span, said worm gear (17) being threadedly engageable within a fixed component (19) (ex. vertical post, etc.) of the base frame (3) so that a rotation of the worm gear (17) in turn drives a lateral displacement of the support frame (5) with respect to the base frame (3).

According to one possible embodiment, the transmission assembly (13) may comprise a chain (21) operatively linking the drum (9) to the worm gear (17), as better shown in FIG. 9, for example.

As also shown, a portion of the shaft (15) of the drum (9) can be provided with a first gear (23), and a portion of the worm gear (17) can be provided with a second gear (25), the chain (21) being mounted onto said first and second gears (25) of the transmission assembly (13), a given gear ratio being established between said first and second gears (25).

Optionally also, the transmission assembly (13) may comprise a chain tensioner (27) for ensuring a given tension within the chain (21).

According to one possible embodiment, the gear ratio is selected in relation to a diameter of the drum (9), and displacement of the support frame (5) and corresponding drum (9) is selected in relation to a diameter of the cable (11) to be wound about the drum (9).

Preferably, the drum (9) of the cable drive unit (1) is configured to rotate once for every incremental displacement of the support frame (5) and corresponding drum (9), said incremental displacement corresponding substantially to a diameter of the cable (11) to be wound about the drum (9).

Even though the spacing between cable segments and the configuration of the drum (9) can be varied according to the present system, according to one possible embodiment, a spacing ranging between about 1/16 of an inch and about 1/8 of an inch is provided between cable segments (or rows, etc.) wound about the drum (9).

As can be easily understood when referring to the accompanying drawings, and more particularly, as better shown in FIGS. 9 and 10, for example, according to a possible embodiment of the present invention, the base frame (3) comprises at least one rail (29) on which the support frame (5) is configured to travel, and the support frame (5) comprises at least one wheel (31) for traveling over a corresponding rail (29) of the base frame (3).

According to one optional embodiment, the base frame (3) comprises a pair of rails (29) on which the support frame (5) is configured to travel, and the support frame (5) comprises a first pair of wheels (31) for traveling over a first corresponding rail (29) of the base frame (3), and a second pair of wheels (31) for traveling over a second corresponding rail (29) of the base frame (3), as exemplified in FIGS. 9-24.

Each wheel (31) of the support frame (5) may comprise a circumferential groove (33) positioned, shaped and sized to travel over a corresponding side edge (35) of a corresponding rail (29) of the base frame (3), as better shown in FIG. 10.

The side edge (35) of the rail (29) can be a corner (ex. V-shaped, etc.) bar (37) rigidly affixable onto the rail (29), or any other suitable shape, in that the circumferential groove (33) of each wheel (31) is preferably configured to be complementary to the shape of the rail (29) on which the wheel (31) is intended to travel, or at the very least, the circumferential groove (33) of each wheel (31) is complementary to the shape of the side edge (35) of the rail (29) on which the wheel (31) is intended to travel.

As also better exemplified in FIG. 10, and according to a possible embodiment of the present invention, each axis of rotation (39) of each wheel (31) of the support frame (5) is inclined inwardly towards the drum (9), and optionally also, each rail (29) is substantially slanted with respect to the base frame (3). Furthermore, the displaceable support frame (5) may comprise bottom portions (41) complementary in shape to the slanted rails (29) of the cable drive unit (1), so as to allow the support frame (5) to move back-and-forth along the base frame (3) without any interference, as can be easily understood when referring to FIG. 9, for example.

The drum (9) and corresponding accessories cooperating therewith can come in various shapes and forms, as can be easily understood. For example, a peripheral surface (43) of the drum (9) could ultimately be "smooth", but according to an optional embodiment of the present system, as exemplified in the accompanying drawings, the peripheral surface (43) of the drum (9) comprises recessed rows (61) for receiving corresponding wound segments (i.e. rows, portions, etc.) of the cable (11) onto the drum (9).

According to other possible embodiments, the drum (9) comprises at least one toothed peripheral edge (45), said toothed peripheral edge (45) being driven by a corresponding driving assembly (47), the driving assembly (47) being configured for driving the drum (9) along a first direction of rotation (ex. clockwise), and along a second opposite direction of rotation (ex. counter-clockwise), so as to wind (ex. roll, etc.) and unwind (ex. unroll, etc.) the cable (11) about the drum (9).

The driving assembly (47) may comprise a least one component selected from the group consisting of motors, gears, sprockets, reducers, chains, links, connectors, and the like, as can be understood by a person skilled in the art, and according to other possible embodiments, as exemplified in the accompanying drawings, the cable drive unit (1) comprises a pair of opposite toothed peripheral edges (45), and thus a pair of driving assemblies (47), each one being used for driving the drum (9) along a given direction of rotation.

According to another possible embodiment of the present invention, the cable drive unit (1) comprises a range-limiting assembly (49) for limiting a distance of travel of the support frame (5) with respect to the base frame (3).

Such a range-limiting assembly (49) may come in various shapes and forms, but according to one possible embodiment illustrated in the accompanying drawings, the range-limiting assembly (49) comprises first and second plates (51*a*, 51*b*) operatively mounted onto the displaceable support frame (5) and each being configured for contacting a given switch (53) at the end of travel, so that at said end of said travel, the corresponding plate (51) contacting the switch (53) turns off a given rotational driving direction of the driving assembly (47) and turns on another opposite given rotational driving direction, thereby urging the displaceable support frame (5) into a reciprocating back-and-forth lateral movement during operation of the cable drive unit (1). The switch (53) can be mountable onto the fixed component (19) (ex. vertical post, etc.) of the base frame (3), for example.

The present cable drive unit (1) may also comprise at least one chain guide (55), and each chain guide (55) may be fixed with respect to the base frame (3), and/or positioned under the base frame (3). It is worth mentioning also that the presence of such a chain guide (55) is not essential for proper operation of the present cable drive unit (1) and is presented as an optional/additional feature only.

As can be understood from the different views illustrated in the accompanying drawings, the cable drive unit (1) may comprise different panels (57) for covering different sections of the cable drive unit (1), and according to optional embodiments, these panels (57) are removably mountable onto said corresponding different sections of the cable drive unit (1), so as to enable a user thereof to properly inspect, maintain and/or service the cable drive unit (1), and the different components thereof, if need may be.

According to another aspect of the present invention, there is provided a free stall cleaning system (101) comprising at least one cable drive unit (1) such as the one described and illustrated herein. The free stall cleaner may comprise at least one accessory (59) selected from the group consisting of scrapers, wheels (ex. corner wheels), pulleys, cables and/or all of the various other accessories known in the prior art.

According to another aspect of the present invention, there is also provided a kit with corresponding components for assembling a cable drive unit (1) and/or a free stall cleaning system (101) such as the one described and illustrated herein.

According to another aspect of the present invention, there is also provided a method of winding a cable (11) of a free stall cleaning system (101) about a drum (9) of a corresponding cable drive unit (1), wherein the method comprises the step of displacing (ex. laterally, etc.) the drum (9) with respect to a base frame (3) while the cable (11) is being wound about the drum (9). The method may further comprise the step of oppositely displacing (ex. laterally reversing, etc.) the drum (9) with respect to the base frame (3) while the cable (11) is being unwound from the drum (9).

As may now better be appreciated, the present invention is a substantial improvement over the prior art in that, by virtue of its design and components, as explained herein, and the particular configuration of the cable drive unit (1) and/or components/accessories thereof, the cable drive unit (1) according to the present invention enables for a quicker, easier, simpler, more effective/reliable and more durable manner than what is possible with respect to other cable drive units available in the prior art.

For example, the present cable drive unit (1) is particularly advantageous in that, by virtue of its design, components and features, as better described and illustrated herein, it enables to eliminate (or at the very least, to substantially reduce) friction with the cable (11) while making sure to keep proper alignment of the cable (11) during operation (winding, pulling, etc.) of the cable drive unit (1). The cable (11) to be wound and/or unwound is preferably kept "straight" (i.e. positioned, centered, etc.) with respect to the drum (9), because the drum (9) is laterally moved as the cable is wound and/or unwound about the drum (9), thereby avoiding and/or minimizing premature cable wear, and as a result, substantially extending the useful life of the cable (11), along with corresponding advantages (cleaner barns, better barn layouts, increased use and productivity for the barn due to less cable replacement, less downtime, etc.).

Of course, and as can be easily by a person skilled in the art, the scope of the claims should not be limited by the possible embodiments set forth in the examples, but should be given the broadest interpretation consistent with the description as a whole.

The invention claimed is:

1. A cable drive unit for use with a free stall cleaning system, the cable drive unit comprising:
a base frame;
a support frame being displaceable with respect to the base frame via a corresponding displacement assembly; and
a drum being pivotably mountable about the support frame and being displaceable therewith for receiving a cable to be wound about said drum, the drum comprising at least one toothed peripheral edge, and said at least one toothed peripheral edge being configured for driving by a corresponding driving assembly;
wherein a spacing ranging between about $1/16$ of an inch and about $1/8$ of an inch is provided between cable segments wound about the drum;
wherein the support frame comprises at least one wheel for traveling over at least one corresponding rail of the base frame;
wherein said at least one corresponding rail comprises first and second corresponding rails on which the support frame is configured to travel;
wherein said at least one wheel comprises a first pair of wheels for traveling over the first corresponding rail of the base frame, and a second pair of wheels for traveling over the second corresponding rail of the base frame;
wherein the driving assembly is configured for driving the drum along a first direction of rotation, and along a second opposite direction of rotation, so as to wind and unwind the cable about the drum, and thus, so as to be able to operate the free stall cleaning system along two different directions;
wherein a transmission assembly is operatively connectable between a shaft of the drum and the displacement assembly, the transmission assembly being configured for laterally displacing the support frame and corresponding drum with respect to the base frame by a certain lateral displacement for every rotational displacement of the drum; and
wherein the transmission assembly comprises a worm gear pivotably mountable about the support frame within a given span, said worm gear being threadedly engageable within a fixed component of the base frame so that a rotation of the worm gear in turn drives a lateral displacement of the support frame with respect to the base frame.

2. A cable drive unit (1) according to claim 1, wherein displacement of the support frame (5) with respect to the base frame (3) is done in a progressive manner.

3. A cable drive unit (1) according to claim 1, wherein displacement of the support frame (5) with respect to the base frame (3) is done incrementally.

4. A cable drive unit according to claim 1, wherein displacement of the support frame with respect to the base frame is synchronized with a rotational displacement of the drum.

5. A cable drive unit according to claim 1, wherein displacement of the support frame with respect to the base frame is synchronized with a rotational displacement of the drum via a corresponding transmission ratio or step of the transmission assembly.

6. A cable drive unit according to claim 1, wherein the transmission assembly comprises a chain operatively linking the drum to the worm gear.

7. A cable drive unit according to claim 6, wherein a portion of the shaft of the drum is provided with a first gear, and wherein a portion of the worm gear is provided with a second gear, the chain being mounted onto said first and second gears of the transmission assembly, a given gear ratio being established between said first and second gears.

8. A cable drive unit according to claim 7, wherein the gear ratio is selected in relation to a diameter of the drum.

9. A cable drive unit according to claim 6, wherein the transmission assembly comprises a chain tensioner for ensuring a given tension within the chain.

10. A cable drive unit (1) according to claim 1, wherein displacement of the support frame (5) and corresponding drum (9) is selected in relation to a diameter of the cable (11) to be wound about the drum (9).

11. A cable drive unit (1) according to claim 1, wherein the drum (9) of the cable drive unit (1) is configured to rotate once for every incremental lateral displacement of the support frame (5) and corresponding drum (9), said incremental lateral displacement corresponding substantially to a diameter of the cable (11) to be wound about the drum (9).

12. A cable drive unit according to claim 1, wherein the base frame comprises the at least one corresponding rail on which the support frame is configured to travel.

13. A cable drive unit according to claim 1, wherein each wheel of the support frame comprises a circumferential groove positioned, shaped and sized to travel over a corresponding side edge of each corresponding rail of the base frame.

14. A cable drive unit according to claim 13, wherein the side edge of each corresponding rail is a corner bar rigidly affixable onto the base frame.

15. A cable drive unit according to claim 13, wherein the circumferential groove of each wheel is complementary to the shape of each rail on which each wheel is intended to travel.

16. A cable drive unit according to claim 13, wherein the circumferential groove of each wheel is complementary to the shape of the side edge of each rail on which each wheel is intended to travel.

17. A cable drive unit according to claim 1, wherein each axis of rotation of each wheel of the support frame is inclined inwardly towards the drum.

18. A cable drive unit according to claim 1, wherein each rail is substantially slanted with respect to the base frame.

19. A cable drive unit according to claim 1, wherein the displaceable support frame comprises bottom portions complementary in shape to the corresponding rails of the cable drive unit.

20. A cable drive unit according to claim 1, wherein a peripheral surface of the drum is smooth.

21. A cable drive unit according to claim 1, wherein a peripheral surface of the drum comprises recessed rows for receiving corresponding wound segments of the cable onto the drum.

22. A cable drive unit according to claim 1, wherein the at least one toothed peripheral edge of the cable drive unit comprises a pair of toothed peripheral edges at opposite ends of the drum, and the corresponding driving assembly comprises a pair of driving assemblies, each one being used for driving the drum along a given direction of rotation.

23. A cable drive unit according to claim 1, wherein the cable drive unit comprises a range-limiting assembly for limiting a distance of travel of the support frame with respect to the base frame.

24. A cable drive unit according to claim 23, wherein the range-limiting assembly comprises first and second plates operatively mounted onto the displaceable support frame and each plate being configured for contacting a given switch at the end of travel of the support frame, so that at the end of travel, one of the plates contacting the given switch turns off a given rotational driving direction of the transmission assembly and turns on another opposite given rotational driving direction, thereby urging the displaceable support frame into a reciprocating back-and-forth lateral movement during operation of the cable drive unit.

25. A cable drive unit according to claim 24, wherein the given switch is mountable onto a fixed component of the base frame.

26. A free stall cleaning system (101) comprising at least one cable drive unit (1) according to claim 1.

27. A free stall cleaner according to claim 26, wherein the free stall cleaner comprises at least one accessory (59) selected from the group consisting of scrapers, wheels, pulleys and cables.

28. A kit with corresponding components for assembling a cable drive unit (1) according to claim 1.

29. A cable drive unit for use with a free stall cleaning system, the cable drive unit comprising:
   a base frame;
   a support frame operatively mountable onto the base frame and being laterally displaceable with respect to said base frame via a corresponding displacement assembly; and
   a drum pivotably mountable about the support frame for receiving a cable to be wound about said drum, the drum comprising at least one toothed peripheral edge, and said at least one toothed peripheral edge being configured for driving by a corresponding driving assembly;
   wherein a spacing ranging between about $1/16$ of an inch and about $1/8$ of an inch is provided between cable segments wound about the drum;
   wherein the support frame comprises at least one wheel for traveling over at least one corresponding rail of the base frame;
   wherein said at least one corresponding rail comprises first and second corresponding rails on which the support frame is configured to travel;
   wherein said at least one wheel comprises a first pair of wheels for traveling over the first corresponding rail of the base frame, and the second pair of wheels for traveling over a second corresponding rail of the base frame;
   wherein the driving assembly is configured for driving the drum along a first direction of rotation, and along a second opposite direction of rotation, so as to wind and unwind the cable about the drum, and thus, so as to be able to operate the free stall cleaning system along two different directions;
   wherein a transmission assembly is operatively connectable between a shaft of the drum and the displacement assembly, the transmission assembly being configured for laterally displacing the support frame and corresponding drum with respect to the base frame by a certain lateral displacement for every rotational displacement of the drum; and
   wherein the transmission assembly comprises a worm gear pivotally mountable about the support frame within a given span, said worm gear being threadedly engageable within a fixed component of the base frame so that a rotation of the worm gear in turn drives a lateral displacement of the support frame with respect to the base frame.

30. A cable drive unit for use with a free stall cleaning system, the cable drive unit comprising:
a base frame;
a support frame being displaceable with respect to the base frame via a corresponding displacement assembly; and
a drum being pivotably mountable about the support frame and being displaceable therewith for receiving a cable to be wound about said drum, the drum comprising at least one toothed peripheral edge, and said at least one toothed peripheral edge being configured for driving by a corresponding driving assembly;
wherein a spacing ranging between about 1/16 of an inch and about 1/8 of an inch is provided between cable segments wound about the drum;
wherein the support frame comprises at least one wheel for traveling over at least one corresponding rail of the base frame;
wherein said at least one corresponding rail comprises first and second corresponding rails on which the support frame is configured to travel;
wherein said at least one wheel comprises a first pair of wheels for traveling over a first corresponding rail of the base frame, and a second pair of wheels for traveling over a second corresponding rail of the base frame;
wherein a transmission assembly is operatively connectable between a shaft of the drum and the displacement assembly, the transmission assembly being configured for laterally displacing the support frame and corresponding drum with respect to the base frame by a certain lateral displacement for every rotational displacement of the drum;
wherein displacement of the support frame with respect to the base frame is synchronized with a rotational displacement of the drum;
wherein displacement of the support frame with respect to the base frame is synchronized with a rotational displacement of the drum via a corresponding transmission ratio of the transmission assembly;
wherein the transmission assembly comprises a worm gear pivotally mountable about the support frame within a given span, said worm gear being threadedly engageable within a fixed component of the base frame so that a rotation of the worm gear in turn drives a lateral displacement of the support frame with respect to the base frame;
wherein the transmission assembly comprises a chain operatively linking the drum to the worm gear; and
wherein a portion of the shaft of the drum is provided with a first gear, and wherein a portion of the worm gear is provided with a second gear, the chain being mounted onto said first and second gears of the transmission assembly, a given gear ratio being established between said first and second gears.

31. A cable drive unit according to claim 30,
wherein each wheel of the support frame comprises a circumferential groove positioned, shaped and sized to travel over a corresponding side edge of each corresponding rail of the base frame;
wherein the side edge of each corresponding rail is a corner bar rigidly affixable onto the base frame;
wherein the circumferential groove of each wheel is complementary to the shape of each rail on which each wheel is intended to travel;
wherein the circumferential groove of each wheel is complementary to the shape of the side edge of each rail on which each wheel is intended to travel;
wherein each axis of rotation of each wheel of the support frame is inclined inwardly towards the drum;
wherein each rail is substantially slanted with respect to the base frame;
wherein the displaceable support frame comprises bottom portions complementary in shape to each slanted rail of the cable drive unit;
wherein a peripheral surface of the drum is smooth;
wherein the at least one toothed peripheral edge of the cable drive unit comprises a pair of toothed peripheral edges at opposite ends of the drum, and the corresponding driving assembly comprises a pair of driving assemblies, each one being used for driving the drum along a given direction of rotation; and
wherein the driving assembly is configured for driving the drum along a first direction of rotation, and along a second opposite direction of rotation, so as to wind and unwind the cable about the drum.

32. A cable drive unit according to claim 30,
wherein the cable drive unit comprises a range-limiting assembly for limiting a distance of travel of the support frame with respect to the base frame;
wherein the range-limiting assembly comprises first and second plates operatively mounted onto the displaceable support frame and each plate being configured for contacting a given switch at the end of travel of the support frame, so that at the end of travel, one of the plates contacting the given switch turns off a given rotational driving direction of the transmission assembly and turns on another opposite given rotational driving direction, thereby urging the displaceable support frame into a reciprocating back-and-forth lateral movement during operation of the cable drive unit; and
wherein the given switch is mountable onto a fixed component of the base frame.

* * * * *